US011887602B1

United States Patent
Wilson et al.

(10) Patent No.: US 11,887,602 B1
(45) Date of Patent: Jan. 30, 2024

(54) AUDIO-BASED DEVICE LOCATIONING

(71) Applicant: Amazon Technologies, Inc., Seattle, WA (US)

(72) Inventors: Brendon Jude Wilson, San Jose, CA (US); Henry Michael D Souza, San Diego, CA (US); Cindy Angie Hou, Mountain View, CA (US); Christopher Evans, Somerville, MA (US); Sumit Garg, Acton, MA (US); Ravina Chopra, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 234 days.

(21) Appl. No.: 17/547,894

(22) Filed: Dec. 10, 2021

(51) Int. Cl.
*G10L 15/30* (2013.01)
*G10L 19/02* (2013.01)
*G10L 15/22* (2006.01)
*G06F 3/16* (2006.01)
*G10L 19/018* (2013.01)

(52) U.S. Cl.
CPC .............. *G10L 15/30* (2013.01); *G06F 3/165* (2013.01); *G06F 3/167* (2013.01); *G10L 15/22* (2013.01); *G10L 19/018* (2013.01); *G10L 19/02* (2013.01)

(58) Field of Classification Search
USPC ....................................................... 704/1–504
See application file for complete search history.

(56) References Cited

U.S. PATENT DOCUMENTS

| | | | | |
|---|---|---|---|---|
| 9,292,895 B2* | 3/2016 | Rodriguez | ............ | H05B 47/12 |
| 9,304,736 B1 | 4/2016 | Whiteley et al. | | |
| 10,074,371 B1* | 9/2018 | Wang | ...................... | G10L 15/08 |
| 10,147,433 B1* | 12/2018 | Bradley | ................ | G10L 19/018 |
| 10,236,006 B1* | 3/2019 | Gurijala | ................... | G10L 19/02 |
| 10,236,031 B1* | 3/2019 | Gurijala | ................ | G10L 19/018 |
| 10,440,324 B1* | 10/2019 | Lichtenberg | ......... | H04L 12/1827 |
| 10,490,195 B1* | 11/2019 | Krishnamoorthy | ..... | G10L 17/22 |
| 10,600,419 B1* | 3/2020 | Sarikaya | .................. | G06F 40/30 |
| 10,950,249 B2* | 3/2021 | Tai | ........................... | G10L 15/05 |

(Continued)

OTHER PUBLICATIONS

The Examiner's attention is hereby drawn to the specification and file history of co-pending U.S. Appl. No. 17/490,271, titled "Audio Watermarking," filed Sep. 30, 2021, which may contain information relevant to the present application.

*Primary Examiner* — Marcus T Riley
(74) *Attorney, Agent, or Firm* — Pierce Atwood LLP

(57) ABSTRACT

Techniques for performing audio-based device location determinations are described. A system may send, to a first device, a command to output audio requesting a location of the first device be determined. A second device may receive the audio and send, to the system, data representing the second device received the audio, where the received data includes spectral energy data representing a spectral energy of the audio as received by the second device. The system may, using the spectral energy data, determine attenuation data representing an attenuation experienced by the audio as it traveled from the first device to the second device. The system may generate, based on the attenuation data, spatial relationship data representing a spatial relationship between the first device and the second device, where the spatial relationship data is usable to determine a device for outputting a response to a subsequently received user input.

20 Claims, 13 Drawing Sheets

(56) References Cited

U.S. PATENT DOCUMENTS

| | | | |
|---|---|---|---|
| 10,978,081 B2* | 4/2021 | Tai | G10L 15/05 |
| 11,069,364 B1* | 7/2021 | Souza | H04R 5/04 |
| 11,741,971 B1* | 8/2023 | You | G10L 19/00 |
| | | | 704/201 |
| 11,769,505 B2* | 9/2023 | Sereshki | G10L 21/0208 |
| | | | 704/233 |
| 2011/0161076 A1* | 6/2011 | Davis | H04M 1/72448 |
| | | | 704/E15.001 |
| 2014/0108020 A1* | 4/2014 | Sharma | G10L 19/018 |
| | | | 704/500 |
| 2014/0142958 A1* | 5/2014 | Sharma | G10L 19/018 |
| | | | 704/500 |
| 2016/0180853 A1 | 6/2016 | VanLund et al. | |
| 2020/0098379 A1* | 3/2020 | Tai | G06F 3/167 |
| 2020/0098380 A1* | 3/2020 | Tai | G10L 13/08 |
| 2021/0327442 A1* | 10/2021 | Tai | G10L 19/018 |

* cited by examiner

AUDIO-BASED DEVICE LOCATIONING

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1A:
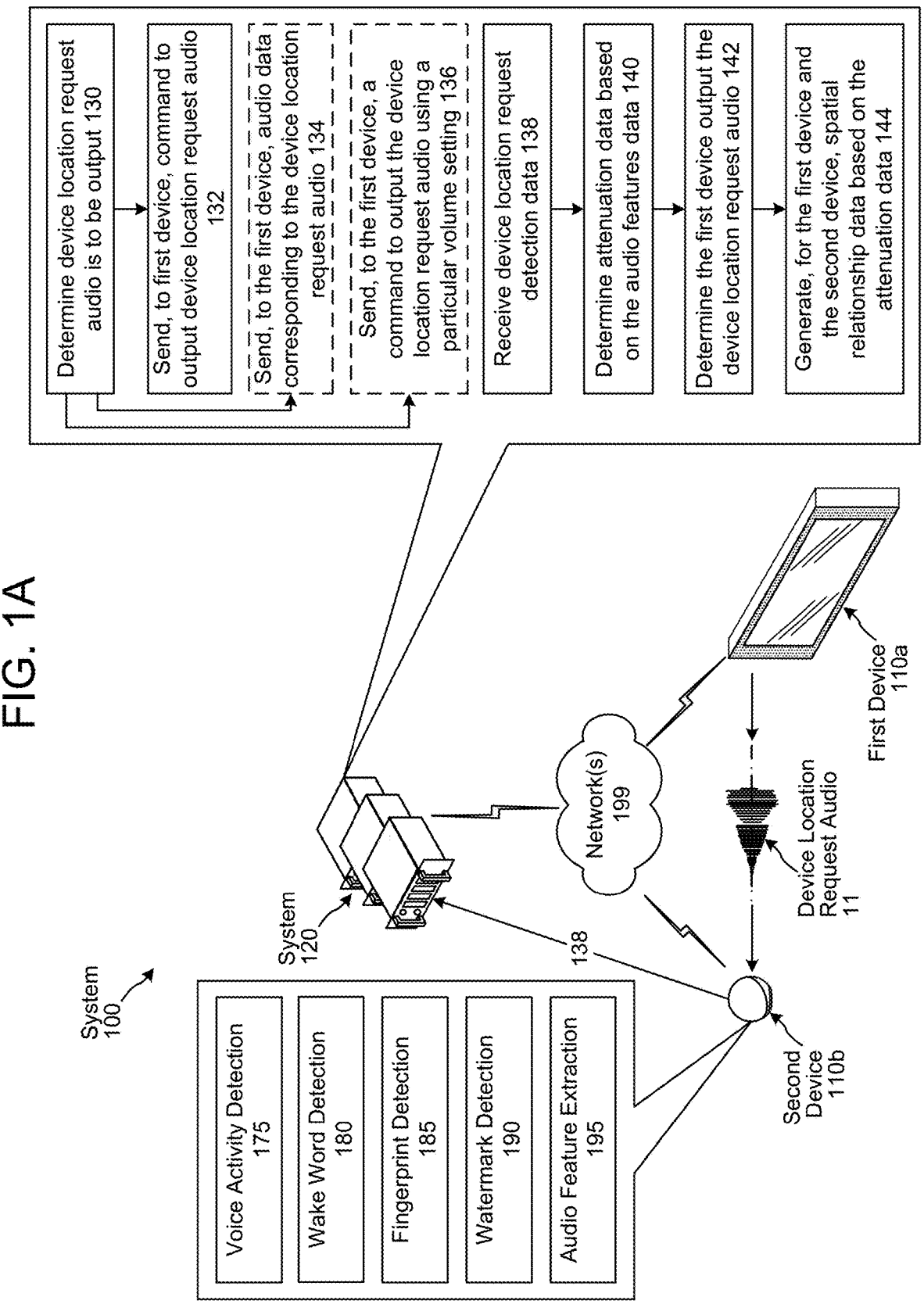
FIG. 1A is a conceptual diagram of a system configured to determine a location of a first device with respect to a second device, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech. Natural language generation (NLG) is a field of artificial intelligence concerned with automatically transforming data into plain-language, e.g., English, content.

A device may be configured to respond to spoken user inputs including a wake word, e.g., Alexa, and a command. For example, in response to the spoken user input "Alexa, tell me a story," a device may output audio of the story using synthesized speech. For further example, in response to the spoken user input "Alexa, play my workout playlist," a device may output audio of music corresponding to the user's "workout playlist." As another example, in response to the user input "Alexa, play [movie title]," a device may output video and audio of the movie.

In some situations, a user may provide a spoken user input to a first device, and a second device is used to output the response to the user input. For example, a user may say "Alexa, play [movie title]" to a displayless device, and a device including a speaker(s) and a display may be used to present video and output audio corresponding to the requested movie.

The present disclosure provides techniques for identifying devices in an environment, e.g., a room of a building, such as a house, hotel, assisted living facility, hospital, etc., for the purpose of selecting a device, sometimes referred to as a "target device," that is best configured to output a response to a user input received by a device in the environment. When a first device is newly registered with a system, e.g., newly associated with a user profile of the system, the first device is rebooted, i.e., powered off and thereafter powered back on, etc., the first device may output audio representing a location of the device, with respect to one or more other devices, is to be determined. For example, the audio may include synthesized speech including a word, sometimes referred to as a wake word, that indicates a location of the first device, with respect to other devices, is to be determined. As used herein, a wake word (which can include a wake phrase having more than one word) is speech that transitions a device from a low-power state to a high-power state for the purpose of performing more resource intensive processing. For further example, the audio may be an acoustic fingerprint that is detectable by one or more other devices. The acoustic fingerprint audio may include a watermark. As used herein, a "watermark" refers to a distinctive sound pattern— which may be imperceivable to humans— included in acoustic fingerprint audio and identifiable by a receiving device. The watermark may be an encoder identifier of the first device that output the acoustic fingerprint audio. Sometimes, an acoustic fingerprint and corresponding watermark may be embedded in some other audio that is output so a user hears the other audio but a device detects the acoustic fingerprint, decodes the watermark, and acts accordingly. In some approaches, a watermark may remain in audio no matter how it may be downscaled, downsized, altered, or transcoded.

A second device may be configured to continuously process received audio to determine whether the received audio is the aforementioned audio that can be used to identify a location of the first device. In response to determining the received audio includes a wake word, or is acoustic fingerprint audio including a watermark, the second device may extract audio features, e.g., spectral energy features, of the received audio. The second device may then send the audio features to a system in data communication with both the first device and the second device.

The system and/or the second device is configured to process the audio features to determine a relative location of the first device with respect to the second device. In some embodiments, the relative location may correspond to an estimated distance between the first device and the second device. In some embodiments, the relative location may represent whether the first and second devices are located in a same environment, e.g., a room of a building. The system may store device spatial relationship data, e.g., an ontology (devices in a room, rooms on a floor, floors in a building, etc.) or other type of mapping of relative device locations. When the system subsequently receives a user input and determines output data responsive to the user input, the system may use the device spatial relationship data to determine which device is to be used to present the output data.

The teachings of the present disclosure, among other things, improve the user experience in a number of ways. In general, it can allow for more "better together" experiences (e.g., a first device outputting audio corresponding to a second device's display), personalization, and deduplications (e.g., only ring one device in an environment). It can also assist in removing a burden on a user to set up device groups in order for a "best" device to be used to output a response to a user input, as well as remove a burden of a user to indicate, in a user input, which device is to be used to output a response. For example, teachings of the present disclosure enable a system to play a video using a device having a screen when a user speaks, to a displayless device, a request to play the video without specifying the device to be used to output the video. For further example, teachings of the present disclosure enable a system to play a video using a device having a high-resolution screen when a user speaks, to a device with a lower resolution screen, a request to play the video without specifying the device to be used to output the video. As another example, teachings of the present disclosure enable a system to output music using a device having a high-quality speaker(s) when a user speaks, to a device with a lower quality speaker(s), a request to play the music without specifying the device to be used to play the music.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1A shows a system 100 configured to determine a location of a first device with respect to a second device. Although the figures and discussion of the present disclosure illustrate certain steps in a particular order, the steps described may be performed in a different order (as well as certain steps removed or added) without departing from the present disclosure.

As shown in FIG. 1A, the system 100 may include a first device 110a, a second device 11b, and a system 120 in data communication across a network(s) 199. The first device 110a and the second device 110b are not limited to the particular types of devices as illustrated. Rather, the first device 110a and the second device 110b are meant to be any device configured to perform the processing described herein. For example, the first device 110a may be any device that includes or is associated with a speaker(s), and the second device 110b may be any device that includes or is associated with a microphone(s). In some embodiments, the first device 110a may not include or be associated with a microphone(s). The network 199 may include the Internet and/or any other wide- or local-area network, and may include wired, wireless, and/or cellular network hardware.

In the example of FIG. 1A, the system 120 may determine (step 130) device location request audio is to be output. The system 120 may make this determination in various situations and based on various factors. Examples of how the system 120 may make this determination are described herein below with respect to FIGS. 4 and 5-6.

After making the foregoing determination, the system 120 may send (step 132), to the first device 110a via the network(s) 199, a command to output device location request audio. In some embodiments, the first device 110a may store audio data corresponding to the device location request audio. In other embodiments, the first device 110a may not store said audio data. In such embodiments, the system 120 may also send (step 134), to the first device 110a via the network(s) 199, audio data corresponding to the device location request audio.

In some embodiments, the first device 110a may be configured to output the device location request audio 11 such that it is audible to a human. For example, the first device 110a may be configured to output the device location request audio 11 at a frequency between 20 Hz and 20 kHz.

As described herein below, audio features of the device location request audio 11, as received by one or more other devices, may be used to determine a relative location of the first device 110a with respect to the one or more other devices. To ensure the accuracy of such determination, it may be beneficial to ensure that device location request audio is output at the same volume regardless of which device is outputting the device location request audio. Accordingly, the system 120 may store data representing different device types, where each device type includes one or more audio output volume settings that are a function of the speaker(s) quality of the speaker(s) of or associated with the device. The system 120 may determine a device type corresponding to the first device 110a; determine the volume settings associated with the device type; determine, from among the volume settings, a volume setting corresponding to the volume at which the device location request audio is to be output; and send (step 136), to the first device 110a via the network(s) 199, a command to output the device location request audio using the determined volume setting. Such ensures device location request audio may be output at the same decibel level, regardless of whether that decibel level corresponds to a volume setting of 6 for one device, or 4 for another device.

In some embodiments, the first device 110a may use the speaker(s) of another device, and the first device 110a may not have control to set the volume setting of the speaker(s), and the other device may not be configured to set its speaker(s) volume setting in response to receiving a command from another device. For example, the first device 110a may plug into a "non-smart" television, and the first device 110a may use the speaker(s) of the television to output the device location request audio 11. In such embodiments, the system 120 may determine a device type of the first device 110a and, based on the device type, send the command, at step 136, to instruct the first device 110a to output audio and/or display text, an image, or other content instructing a user to manually set the volume setting of the speaker(s) of the other device to the required volume setting. As another example, the system 120 may determine the device type of the first device 110a and, based on the device type, send, to a smart phone, tablet, etc. of the user, a command to use a push notification to display an information card requesting the user set the volume setting of the speaker(s) of the other device to the appropriate setting. The system 120 may not send the command, at step 132, until after the system 120 receives data indicating the user has manually set the speaker(s) to the required volume setting. The user input may be provided via a voice user interface (VUI) or graphical user interface (GUI) of the first device 110a or the smart phone, tablet, etc. of the user, depending on the situation. This may ensure the first device 110a does not cause the speaker(s), of the other device, to output the device location request audio 11 until after the system 120 is confident the device location request audio 11 will be output at the appropriate volume level.

In some embodiments, the first device 110a may be configured to output the device location request audio 11 such that it is not audible to a human. For example, the first device 110a may be configured to output the device location request audio 11 at an infrasonic frequency, i.e., a frequency below 20 Hz. For further example, the first device 110a may be configured to output the device location request audio 11 at an ultrasonic frequency, i.e., a frequency above 20 kHz. In some embodiments, the command, output by the system 120 and received by the first device 110a at step 132, may indicate a frequency at which the device location request audio 11 is to be output.

The frequency, at which the first device 110a is to output the device location request audio 11 may depend on hardware configurations, e.g., microphone size and/or quality, of other devices, e.g., the second device 110b, associated with the same profile data, e.g., user profile data and/or group profile data, as stored by the system 120. The system 120 may determine the types of frequencies capable of being detected by devices, except the first device 110a, associated with the profile data. The types of frequencies, capable of being detected by a device, may be represented in device profile data corresponding to the device 110b, or may be based on a device type to which the device 110b corresponds. In situations where the system 120 determines the aforementioned profile data indicates the at least three devices, one of which is the first device 110a, the system 120 may determine a frequency that is detectable by as many of or all of the devices, except for the first device 110a. The system 120 may send, to the first device 110a, a command to output the device location request audio at the determined frequency.

The first device 110a may output the device location request audio 11 according to the command(s) received from the system 120. In some embodiments, the device location request audio 11 may be synthesized speech generated using TTS processing, wherein the synthesized speech includes at least a first word, e.g., a wake word, that indicates to other devices that device location processing is to be performed.

In some embodiments, the device location request audio 11 may be an acoustic fingerprint detectable by one or more other devices, e.g., the second device 110b. An acoustic fingerprint is a compact representation of relevant acoustic features of the corresponding audio. Audio fingerprinting allows for audio to be identified even after compression and any degradation in sound quality.

In embodiments where the device location request audio 11 is an acoustic fingerprint, the device location request audio 11 may include a watermark corresponding to an encoded identifier of the first device 110a, e.g., an encoder serial number of the first device 110a. The system 120 or the first device 110a, depending on the situation, may include an encoder configured to encode the device identifier, of the first device 110a, in the acoustic fingerprint audio. Various art- and industry-known encoders exist for encoding an aforementioned watermark in audio. The system 120 or the first device 110a may implement any art- or industry-known encoder for encoding the watermark.

Figure 2:
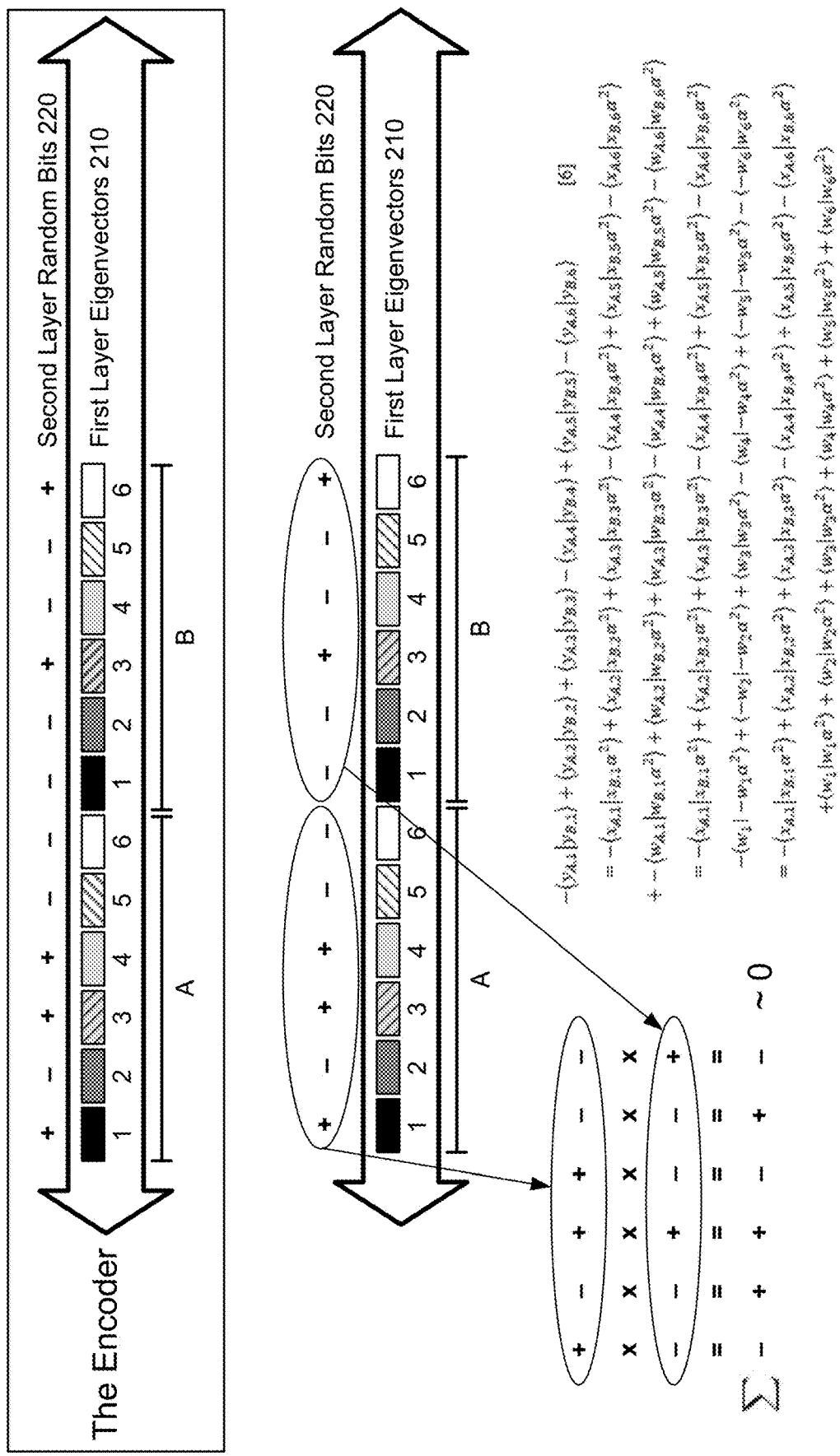
FIG. 2 illustrates an example of a bi-layer watermark encoding structure, according to embodiments of the present disclosure.

In some embodiments, the system 120 or the first device 110a may implement an encoder such as that illustrated in FIG. 2. FIG. 2 illustrates an example of a bi-layer watermark encoding structure. The bi-layer watermark encoding structure illustrated in FIG. 2 corresponds to two layers, a first layer comprising an eigenvector matrix as a building block for the audio watermark, and a second layer that applies a sign sequence to the eigenvector matrix in order to cancel repetitive portions of the original audio segment.

In linear algebra, an eigenvector or characteristic vector of a linear transformation is a non-zero vector that changes by only a scalar factor when that linear transformation is applied. For example, Eigenvectors are a set of orthonormal vectors:

$$(m|n) = \beta_{m,n} \qquad \text{Equation 1}$$

where an Eigenvector generating matrix can be defined:

$$\hat{H} = \begin{bmatrix} a_{11} & a_{12} & \cdots & a_{1n} \\ a_{21} & a_{22} & & a_{2n} \\ \vdots & & \ddots & \vdots \\ a_{n1} & a_{n2} & \cdots & a_{nn} \end{bmatrix}$$

where $\hat{H}$ is designed to be a symmetric ($a_{ij} = a_{ji}$) or hermitian ($a_{ij} = a^*_{ji}$) matrix.

Accordingly, $a_{ij}$ are a set of random numbers. As discrete cosine transform (DCT) based watermark encoding algorithms may be applied, the disclosure will only focus on real numbers of $a_{ij}$. Throughout the diagonalization of $\hat{H}$, corresponding Eigenvalue and Eigenvectors can be obtained:

$$\hat{H}|w_n\rangle = E_n|w_n\rangle \qquad \text{Equation 2}$$

As illustrated in FIG. 2, the first layer Eigenvectors 210 correspond to a series of segments, with the entire series repeating a certain number of times. For example, the first layer Eigenvectors 210 include six segments (e.g., segment 1-6) that repeats twice (e.g., portion A and portion B). Thus, the first portion corresponds a first series of segments A1-A6 and the second portion corresponds to a second series of segments B1-B6. However, the disclosure is not limited thereto and the number of segments and/or the number of repetitions may vary without departing from the disclosure.

The first layer Eigenvectors 210 make use of the same concept as the self-correlation algorithm. For example, a first segment of the first portion (A1) and a first segment of the second portion (B1) may use a first audio watermark value, a second segment of the first portion (A2) and a second segment of the second portion (B2) may use a second audio watermark value, and so on. Thus, a device(s), e.g., the second device 110b, may detect the audio watermark by performing a cross-correlation between the first portion A and the second portion B, with a strong correlation existing between segments A1-B1, A2-B2, A3-B3, A4-B4, A5-B5, and A6-B6. While repetitive chords or other repetitions in the original audio segment may interfere with detecting each peak associated with the corresponding segments, the device (s) may detect the audio watermark and/or determine a beginning of the audio watermark using only the first layer Eigenvectors 210 without departing from the disclosure.

To improve the detection of the audio watermark, however, the device(s) may apply a predetermined sign sequence to the Eigenvector matrix to remove the interference caused by repetitions in the original audio segment. The sign sequence corresponds to a series of positive or negative values (e.g., +1 or −1) which is applied to the first layer Eigenvectors 210 to modify the binary phase of the first layer Eigenvectors 210. The sign sequence is illustrated in FIG. 2 as second layer random bits 220.

As illustrated in FIG. 2, a first portion of the second layer random bits 220 (e.g., first sign changes associated with portion A) is applied to the first repetition of the first layer Eigenvectors 210 (e.g., A1-A6) and a second portion of the second layer random bits 220 (e.g., second sign changes associated with portion B) is applied to the second repetition of the first layer Eigenvectors 210 (e.g., B1-B6). The second layer random bits 220 enables the system 100 to detect the audio watermark whether the original audio segment is repetitive (e.g., $x_a$ correlates to $x_b$) or not.

The inner product $\langle \tilde{y}_a | \tilde{y}_b \rangle^q$ (e.g., cross-correlation between the first portion A and the second portion B) effectively corresponds to two elements: a first inner product $\langle x_a | x_b \rangle$ between the first portion $x_a$ and the second portion $x_b$ of the original audio segment, and a second inner product $\langle w_a | w_b \rangle$ between the first representation $w_a$ and the second representation $w_b$ of the audio watermark. When the original audio segment is not repetitive (e.g., $x_a \neq x_b$), the first inner product $\langle x_a | x_b \rangle$ may be effectively ignored and thus the inner product $\langle \tilde{y}_a | \tilde{y}_b \rangle^q$ corresponds to the audio watermark.

In contrast, when the original audio segment is repetitive (e.g., $x_a \sim x_b$), the first inner product $\langle x_a | x_b \rangle$ cannot be ignored. However, by applying the second layer random bits 220, the device(s), e.g., the second device 110b, may cancel out the first inner product $\langle x_a | x_b \rangle$. For example, if an inner product for a first segment $\langle x_{a1} | x_{b1} \rangle$ has a different sign than an inner product for a second segment $\langle x_{a2} | x_{b2} \rangle$, the opposite signs cancel each other out. Thus, a sum of the first inner product $\langle x_a | x_b \rangle$ for each segment of the first layer Eigenvectors 210 may be equal to zero, enabling the device (s) to cancel the correlation associated with the original audio segment without cancelling the correlation associated with the audio watermark itself.

As illustrated on the bottom left in FIG. 2, the sign changes associated with the first portion A and the second portion B are multiplied for each segment. For example, an inner product of the first portion of the second layer random bits 220 and the second portion of the second layer random bits 220 results in a series of sign changes that correspond to the cross-correlation between the first portion A and the second portion B. This series of sign changes may apply separately to the first inner product $\langle x_a | x_b \rangle$ between the first portion $x_a$ and the second portion $x_b$ of the original audio segment and the second inner product $\langle w_a | w_b \rangle$ between the first representation $w_a$ and the second representation $w_b$ of the audio watermark, as shown in the equation illustrated on the bottom right of FIG. 2.

$\langle \tilde{y}_{A,i} | \tilde{y}_{B,i} \rangle$ corresponds to an inner product of a first portion of the watermarked audio data and a second portion of the watermarked audio data, $\langle x_{A,i} | x_{B,i} \rangle$ 33 corresponds to an inner product of a first portion of the original audio data and a second portion of the original audio data, $\langle w_{A,i} | w_{B,i} \rangle$ corresponds to an inner product of a first representation of an audio watermark included in the first portion of the watermarked audio data and a second representation of the watermark included in the second portion of the watermarked audio data, and the first representation and the second representation correspond to an original watermark $w_i$, such that $\langle w_i | w_i \rangle$ corresponds to an inner product of the original watermark $w_i$ represented in the first portion of the watermarked audio data and original watermark $w_i$ represented in the second portion of the watermarked audio data.

As illustrated in the equation in the bottom right of FIG. 2, the device(s), e.g., the second device 110b, may perform sign correction such that each of the inner products associated with the audio watermark is positive. For example, the device(s) may include the sign indicated by the second layer random bits 220 in the encoding algorithm and may account for the second layer random bits 220 in the decoding algorithm, such that the second layer random bits 220 are squared and therefore positive. As a result, the inner products associated with the original audio data include positive and negative values, which may offset and/or reduce a contribution of the original audio data, while the inner products associated with the audio watermark include only positive values, increasing a contribution of the audio watermark.

In some embodiments, the device location request audio 11, e.g., the acoustic fingerprint and watermark, may be included in background audio. Background audio may refer to audio that is output by the first device 110a in conjunction with outputting the device location request audio 11, but the background audio may not relate to the device location request. For example, the background audio may be TTS synthesized speech output in response to a user input, and the device location request audio 11 may be output in conjunction with the TTS synthesized speech.

Referring again to FIG. 1A, the second device 110b may be configured to continuously receive audio using one or more microphones of or associated with the second device 110b. As the second device 110b receives audio, the second device 110b may process audio data, corresponding to the received audio, to determine whether the audio data includes a wake word, and/or whether the audio data corresponds to a known acoustic fingerprint. In some embodiments, the second device 110b may perform wake word detection at least partially in parallel to performing acoustic fingerprint detection. By configuring the second device 110b to process continuously received audio to detect wake words and acoustic fingerprints, the second device 110b is able to detect the device location request audio 11 without needing the system 120 to coordinate detection of the device location request audio 11, e.g., without needing the system 120 to send a command, to the second device 110b, to configure processing thereof to detect the device location request audio 11 when the first device 110a is going to output the device location request audio 11.

To determine whether audio data includes a wake word, the second device 110*b* may first have to determine whether the audio data includes speech. The second device 110*b* may include a voice activity detection (VAD) component 175 that may use various techniques to determine whether audio data includes speech, whether synthesized or spoken by a human. In some examples, the VAD component 175 may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the VAD component 175 may implement a classifier configured to distinguish speech from background noise. The classifier may be implemented by techniques such as linear classifiers, support vector machines, and decision trees. In still other examples, the VAD component 175 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once the VAD component 175 detects speech in the audio data, a wake word detection component 180, of the second device 110*b*, may determine if the speech includes one or more wake words. The second device 110*b* may be configured to detect various wake words. For example, the second device 110*b* may be configured to identify one or more wake words, e.g., "Alexa," "Computer," etc., indicating that the audio data includes a spoken natural language input, and that the audio data is to undergo speech processing, as performed by the second device 110*b* and/or the system 120. For further example, the second device 110*b* may be configured to identify one or more wake words indicating the audio data corresponds to a request to determine device location, i.e., corresponds to the device location request audio 11.

Wake word detection is typically performed without performing linguistic analysis, textual analysis, or semantic analysis. Instead, the audio data is analyzed to determine if specific characteristics of the audio data match preconfigured acoustic waveforms, audio signatures, or other data corresponding to a wake word.

Thus, the wake word detection component 180 may compare the audio data to stored data to detect a wake word. The wake word detection component 180 may be configured implement one or more approaches to determine the presence of a wake word. One approach for wake word detection applies general large vocabulary continuous speech recognition (LVCSR) systems to decode audio signals, with wake word searching being conducted in the resulting lattices or confusion networks. Another approach for wake word detection builds HMMs for each wake word and non-wake word speech signals, respectively. The non-wake word speech includes other spoken words, background noise, etc. There can be one or more HMMs built to model the non-wake word speech characteristics, which are named filler models. Viterbi decoding is used to search the best path in the decoding graph, and the decoding output is further processed to make the decision on wake word presence. This approach can be extended to include discriminative information by incorporating a hybrid deep neural network (DNN)-HMM decoding framework. In another example, the second device 110*b* may be built on deep neural network/recursive neural network (RNN) structures directly, without HMM being involved. Such an architecture may estimate the posteriors of wake words with context data, either by stacking frames within a context window for DNN, or using RNN. Follow-on posterior threshold tuning or smoothing is applied for decision making. Other techniques for wake word detection, such as those known in the art, may also be used.

The second device 110*b* may also include a fingerprint detection component 185 configured to determine whether audio data corresponds to a known acoustic fingerprint. The fingerprint detection component 185 may store, or have access to a stored, acoustic fingerprint outputtable by the first device 110*a* as the device location request audio 11. The fingerprint detection component 185 may process audio data to extract features thereof, and may compare those features to the stored acoustic fingerprint. Various art- and industry-known techniques exist for extracting features of audio data for the purpose of generating an acoustic fingerprint. The fingerprint detection component 185 may implement any one or more of the art- and/or industry-known techniques. If the extracted features correspond to a stored acoustic fingerprint, the fingerprint detection component 185 may cause a watermark detection component 190, of the second device 110*b*, to be invoked.

In some embodiments, the second device 110*b* may implement a machine learning (ML) model/classifier to detect when received audio corresponds to device location request audio. Such ML model/classifier may be trained using positive examples of device location request audio, and negative examples of audio not corresponding to device location request audio. When the ML model/classifier detects device location request audio, the ML model/classifier may cause the watermark detection component 190 to be invoked.

The watermark detection component 190 may implement a decoder configured to determine the presence of a watermark, i.e., the device identifier of the first device 110*a*, in the acoustic fingerprint audio data. Various art- and industry-known decoders exist for detecting a watermark in audio data. The watermark detection component 190 may implement any art- or industry-known decoder for detecting a watermark in audio data. In some embodiments, the second device 110*b* may implement the decoding algorithm:

$$\Gamma(t=t') \equiv \sum_{i=1}^{N_{seg}} \sum_{n=1}^{N_{rep}-1} \sum_{m=n+1}^{N_{rep}} \frac{s_{m,i} s_{n,i} \langle y_{m,i} | y_{n,i} \rangle_{lo \to hi}^{q}}{g_{m,i}^{lo \to hi} g_{n,i}^{lo \to hi}} \quad \text{Equation 3}$$

where $$g_{m,i}^{lo \to hi} = \sqrt[q]{\langle y_{m,i} | y_{m,i} \rangle_{lo \to hi}^{q}} \quad \text{Equation 4}$$

$$g_{n,i}^{lo \to hi} = \sqrt[q]{\langle y_{n,i} | y_{n,i} \rangle_{lo \to hi}^{q}} \quad \text{Equation 5}$$

where $\harpoon(t=t')$ is the decoding score, $N_{rep}$ is the number of repetitions of the Eigenvector, $N_{seg}$ is the number of segments included in each Eigenvector, $s_{m,i}$ is the sign sequence for a combination of the segments and repetitions for a first portion A, $s_{n,i}$ is the sign sequence for a combination of the segments and repetitions for a second portion B, $y_{m,i}$ is a first portion of a received watermark embedded audio sequence associated with the first portion A, $y_{n,i}$ is a second portion of the received watermark embedded audio sequence associated with the second portion B, $\langle \tilde{y}_{m,i} | y_{n,i} \rangle$ is the inner product of the first portion $y_{m,i}$ and the second portion $y_{n,i}$, $g_{m,i}$ is the segment normalization factor for the first portion A, $g_{n,i}$ is the segment normalization factor for the second portion B, and the notation lo→hi denotes that the frequency domain inner product only goes from $q_{lo}$ to $q_{hi}$.

In some embodiments, the second device 110b may implement wake word detection, fingerprint detection, and/or watermark detection as separate components, as illustrated in FIG. 1A. In other embodiments, the second device 110b may include a single component configured to perform wake word detection, fingerprint detection, and/or watermark detection.

If the VAD component 175 determines audio data does not include speech, and the fingerprint detection component 185 determines the audio data does not correspond to an acoustic fingerprint, the second device 110b may cease processing with respect to the audio data. If the VAD component 175 determines audio data includes speech and the wake word detection component 180 determines the audio data does not include a wake word, and the fingerprint detection component 185 determines the audio data does not correspond to an acoustic fingerprint, the second device 110b may cease processing with respect to the audio data. If the VAD component 175 determines audio data includes speech and the wake word detection component 180 determines the audio data includes a wake word corresponding to a device location request, and/or the fingerprint detection component 185 determines the audio data corresponds to an acoustic fingerprint, an audio feature extraction component 195 may process the audio data to determine audio features, e.g., representing spectral energy, of the audio data.

If an audio signal originates at point A and propagates to point B, it will have less energy when it reaches point B. This loss of energy is referred to as attenuation. Attenuation may be related to or dependent on how far the audio signal must travel to reach point B. The attenuation is stronger, i.e., the loss of energy is greater and the received signal energy is lower, when the audio signal has to travel farther. The attenuation may also be dependent on the number of propagation paths between the signal source, i.e., point A, and the signal destination, i.e., point B. In an environment where a direct pathway without any potential reflective surfaces, e.g., an echo-free chamber, is available, the signal energy at point B may be significantly lower compared to an environment that includes surfaces that the audio signal can efficiently reflect off to arrive at point B. In addition to attenuation, the signal energy measured or realized by the destination source may also depend on its microphone gain.

In an example embodiment, the audio feature extraction component 195 may generate audio features data by performing a Fast Fourier Transform (FFT) on a portion of the device location request audio 11, corresponding to the wake word, fingerprint, or watermark, to transform the audio signal into the frequency domain. As an example, the audio feature extraction component 195 may perform FFT on approximately 10-millisecond intervals of the audio signal corresponding to the duration of the wake word, fingerprint, or watermark. In an example embodiment, such processing may result in 256 spectral components, which may be grouped into 32 spectral bands, where each band is a summation of 8 spectral components.

The second device 110b may send, to the system 120 via the network(s) 199, and the system 120 may receive (step 138) device location request detection data. The device location request detection data may include a device identifier of the second device 110b; an indicator representing the device location request audio 11 was detected, i.e., an indicator representing a wake word and/or acoustic fingerprint corresponding to a device location request was detected; an indicator representing the device location request audio 11 including the device identifier of the first device 110a, and the audio features data described above.

In response to receiving the device location request detection data, the system 120 may determine (step 140) attenuation data based on the audio features data represented in the device location request data, as well as determine (step 142) the first device 110a output the device location request audio 11 to which the device location request detection data corresponds. The order in which the system 120 performs steps 140 and 142 is configurable. For example, the system 120 may perform step 140 before step 142, may perform step 142 before step 140, or may perform steps 140 and 142 at least partially in parallel.

The system 120 may determine the attenuation data using various techniques. In general, audio propagates through air as a pressure wave. The "volume" or perceived loudness of the wave realized by a device is measured as sound pressure level. As audio waves propagate through air, they lose energy. Thus, as the receiving device gets further away from the source device, the sound pressure level at the receiving device decreases. Microphones have a "gain" characteristic that is a scalar value that when multiplied with sound pressure level measured at the microphone, provides the signal output value from the microphone.

When the first device 110a outputs the device location request audio 11, the sound pressure level of the device location request audio 11 is the strongest as it emanates from the first device 110a. As the device location request audio 11 propagates through the air and reflects off of surfaces, the device location request audio 11 reaches the device 110b (D1). The device location request audio 11 (d1), as received by the second device 110b may be calculated as:

$$d1 = s \times A1 \times G1, \quad \text{Equation 6}$$

where s refers to the sound pressure level, A1 refers to the attenuation of the device location request audio 11 as received by the second device 110b, and G1 refers to the microphone gain corresponding to the second device 110b.

Since it is known that the device location request audio 11 is output by a device, i.e., the first device 110a, the device location request audio 11 (d2), as output by the first device 110a may be calculated as:

$$d2 = s \times A2 \times G2, \quad \text{Equation 7}$$

where s refers to the sound pressure level, A2 refers to the attenuation of the device location request audio 11 as output by the first device 110a, and G2 refers to the microphone gain corresponding to first device 110a.

Since it is known that the device location request audio 11 is output by the first device 110a, the attenuation A2 can be estimated to be 1.0. That is, the signal d2 output by D2 experienced none or negligible energy loss. In this example, then the attenuation A1 represents the acoustic attenuation of the path from the first device 110a to the second device 110b, which may be referred to as the inter-device attenuation corresponding to the first device 110a and the second device 110b. Determination of the inter-device attenuation in this example is as follows:

$$d1/d2 = (s \times A1 \times G1)/(s \times A2 \times G2) \quad \text{Equation 8}$$

$$d1/d2 = (A1/A2) \times (G1/G2) \quad \text{Equation 9}$$

Since A2 is 1.0 in this example, the above simplifies to:

$$d1/d2 = A \times (G1/G2) \quad \text{Equation 10}$$

The attenuation data, determined by the system 120 at step 140, may correspond to value resulting from a solution of Equation 10 above.

In some instances, the device location request detection data may not include an indicator that the device location request audio included the device identifier of the first device 110a, e.g., in instances where the device location request audio 11 includes the device location request wake word. In such instances, the system 120 may use various techniques to determine the first device 110a output the device location request audio 11. In some embodiments, the system 120 may determine user profile and/or group profile data associated with the device identifier of the second device 110b, as represented in the device location request detection data received at step 138; determine at least a device identifier of the first device 110a is also associated with the user profile and/or group profile data; determine the first device 110a was recently sent, at step 132, a command to output device location request audio; and, based thereon, determine the first device 110a output the device location request audio 11 corresponding the device location request detection data received at step 138.

In some embodiments, the system 120 may not send the command to the first device 110a at step 132. In some embodiments, the first device 110a may be configured to output the device location request audio 11 without receiving the command. For example, the first device 110a may be configured to output the device location request audio 11 as part of a device registration process in which the first device 110a becomes associated with a user and/or group profile; in response to a user input selecting a button of or displayed by the first device 110a; in response to a Wi-Fi signal strength, experienced by the first device 110a fluctuating by at least a threshold amount; in response to the first device 110a rebooting, etc. Nonetheless, the system 120 or second device 110b may still determine the first device 110a output the device location request audio 11. For example, the system 120 may determine such based on the device location request detection data, received at step 138, including an indication that the device location request audio 11 included the device identifier of the first device 110a, For further example, the system 120 may determine user profile and/or group profile data associated with the device identifier of the second device 110b, as represented in the device location request detection data received at step 138; determine at least a device identifier of the first device 110a is also associated with the user profile and/or group profile data; determine the first device 110a recently underwent a device registration process, was recently rebooted, etc.; and, based thereon, determine the first device 110a output the device location request audio 11 corresponding the device location request detection data received at step 138.

The system 120 may generate (step 144) spatial relationship data based on the attenuation data, where the spatial relationship data represents a spatial relationship between the first device 110a and the second device 110b. In other words, the spatial relationship data may represent a spatial position associated with the first device 110a with respect to the second device 110b. In some embodiments, the system 120 may determine the attenuation data as representing a particular distance between the first device 110a and the second device 110b. In such embodiments, the system 120 may generate the spatial relationship data to represent the distance. For example, the system 120 may generate a map illustrating the first device 110a being separated from the second device 110b by the determined distance. In some embodiments, the system 120 may determine the attenuation data as representing whether or not the first device 110a and the second device 110b are in a same environment, e.g., a same room.

Figure 1B:
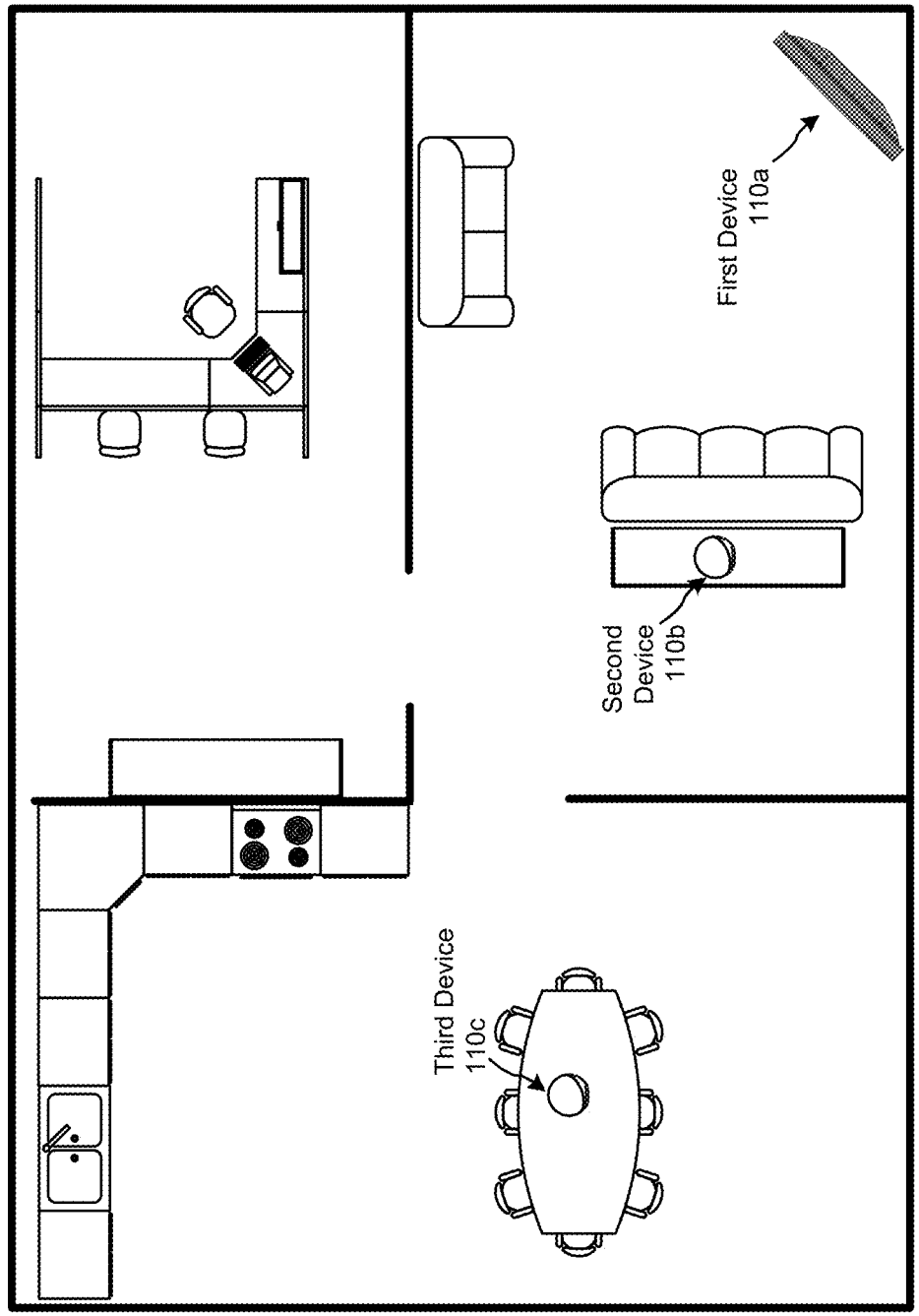
FIG. 1B is a conceptual diagram illustrating a building having a first device in a second device positioned within a same environment, according to embodiments of the present disclosure.
Figure 1C:
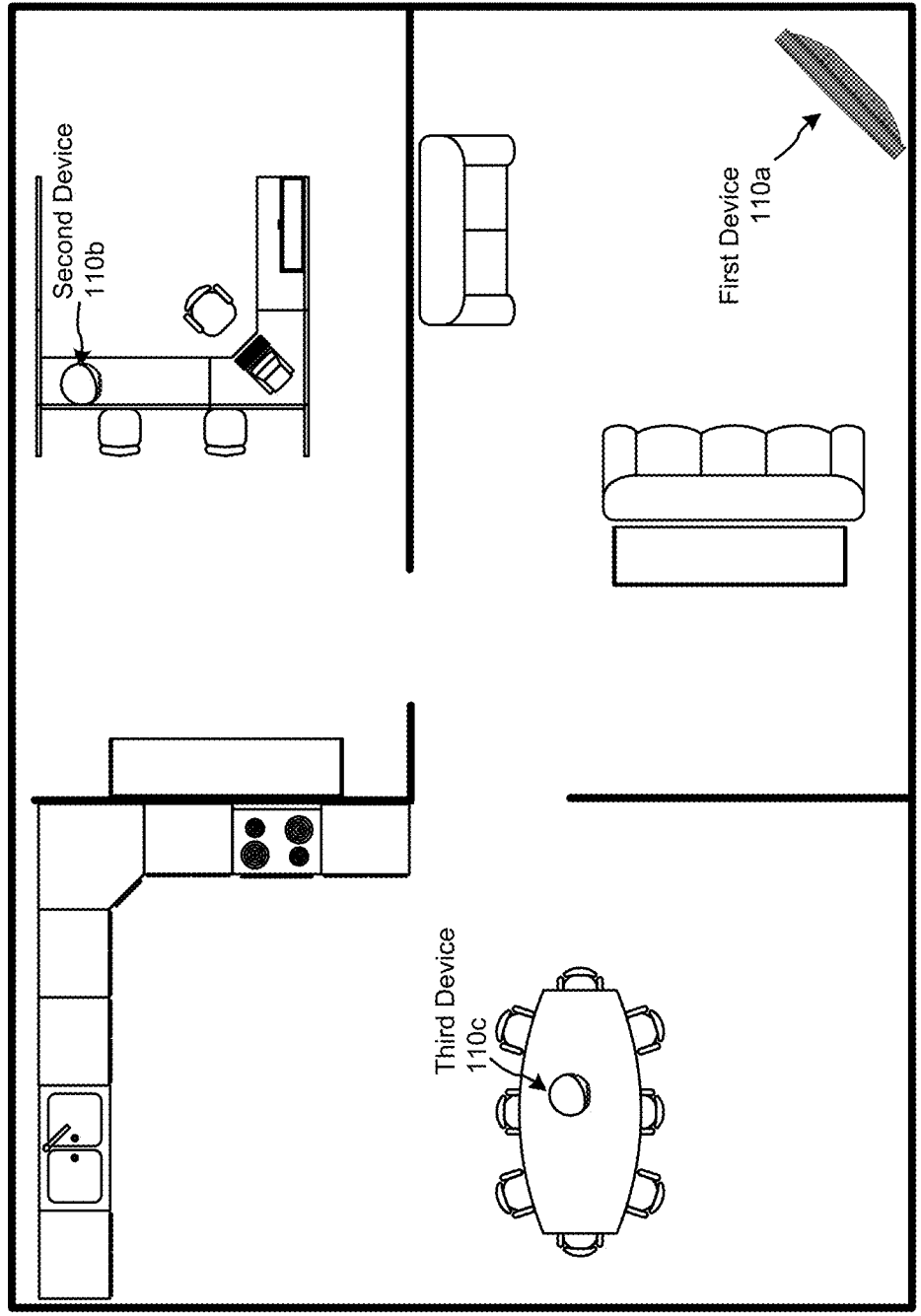
FIG. 1C is a conceptual diagram illustrating the building having the first device in the second device positioned within different environments, according to embodiments of the present disclosure.

As illustrated in FIG. 1B, the first device 110a and the second device 110b may be positioned in a same environment, i.e., room, of a building 197. A third device 110c may be positioned in a different environment of the building 197. The building may be any type of structure including, but not limited to a house, hotel, assisted living facility, hospital, and the like. In the example of FIG. 1B, the device location request audio 11 may travel from the first device 110a to the second device 110b without having to travel through a sound damping structure, i.e., a wall, but may have to travel through a sound damping structure to travel from the first device 110a to the third device 110c. In the example of FIG. 1C, the first device 110a and the third device 110c may be positioned in different environments, i.e., rooms, of the building 197 than the first device 110a, such that the device location request audio 11 travels through sound damping structures, i.e., walls as it travels from the first device 110a to the second device 110b and the third device 110c. It will be appreciated that the attenuation, experienced by the device location request audio 11, will be significantly different depending on whether it has to travel to a sound damping structure to reach a receiving device. Such difference in attenuation may be determined by the system 120 based on attenuation data. As such, the system 120 may, in some embodiments, generate the spatial relationship data to represent whether or not two devices are in a same environment. As described below with respect to FIG. 1C, the system 120 may generate spatial relationship data to represent relative locations of all possible pairs of devices, where each pair includes the device that output the device location request audio and a different device that received the device location request audio.

As detailed herein below with respect to FIG. 7, the system 120 may use the spatial relationship data to determine which device is to be used to output a response to a user input.

It will be appreciated that, while the foregoing description relates to determining relative locations of the first device 110a and the second device 110b, the present disclosure is not limited thereto. In some embodiments, more than just the second device 110b may receive the device location request audio 11 and detect the device location request wake word and/or acoustic fingerprint. The processing, described above with respect to FIG. 1A, may be performed with respect to each device that receives the device location request audio 11 and detects the device location request wake word and/or acoustic fingerprint.

Figure 3:
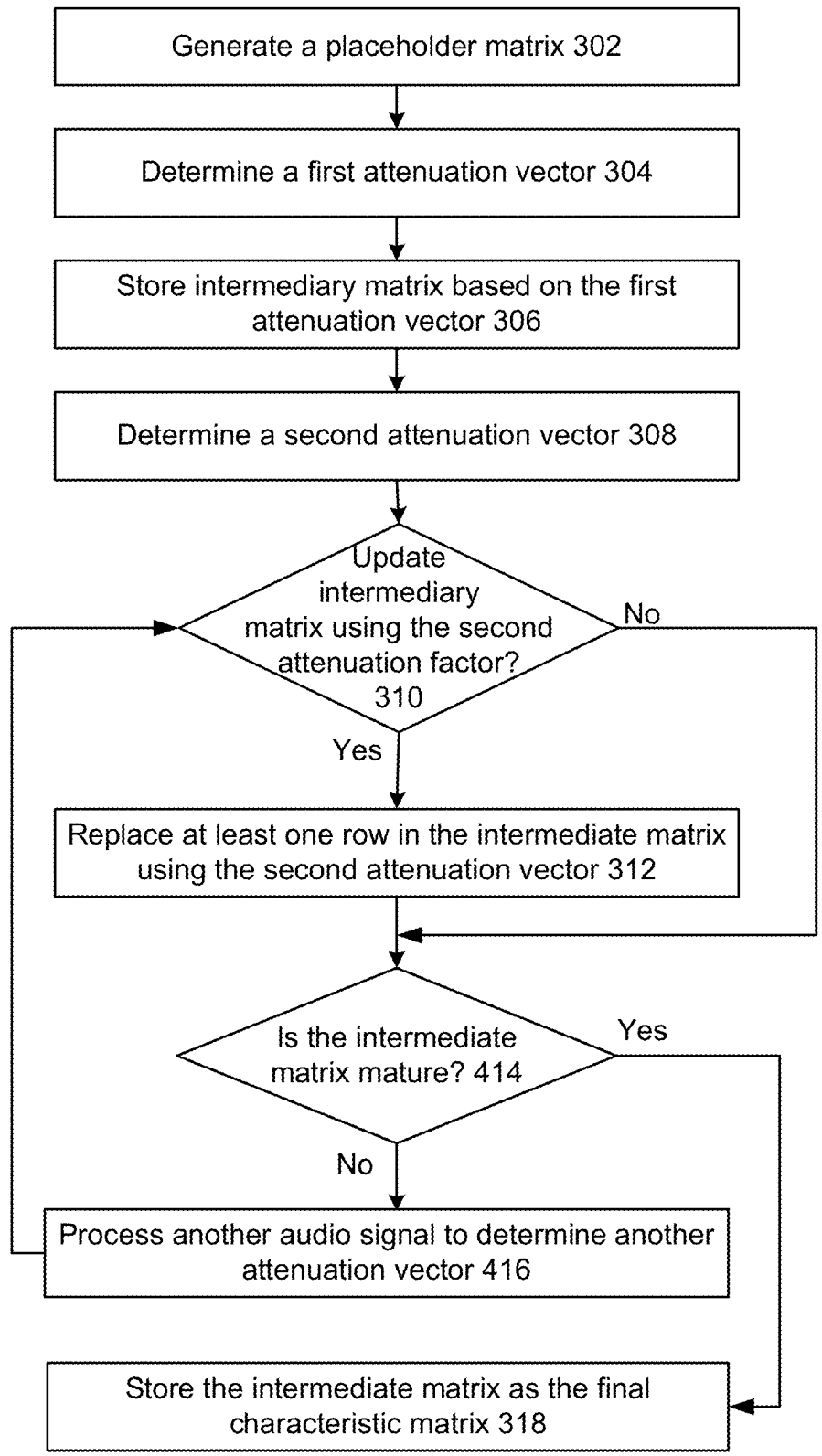
FIG. 3 is a flow diagram illustrating how a system may generate spatial relationship data, according to embodiments of the present disclosure.

In some embodiments, the system 120 may generate spatial relationship data corresponding to devices of a household, hospital, business, assisted living facility, hotel, etc. using stored attenuation data according to the process illustrated in FIG. 3. The stored attenuation data may represent device location request audio 11 previously output from one or more devices of the household, hospital, business, assisted living facility, hotel, etc. The stored attenuation data may be retrieved from a user profile storage, in some embodiments.

The system 120 may generate the spatial relationship data by systematically converging on a useful or effective matrix that most accurately represents the devices' locations relative to one another. In some embodiments, the system 120 may cycle through multiple instances of stored attenuation data to determine a set of N instances, each representing an instance when the device, outputting the corresponding device location request audio, was closest to a particular device out of N devices.

The system 120 may compute an energy ratio vector with respect to each device that captured/heard an instance of device location request audio. The signal energy received by each device is denoted by d, e.g., d1 is received by device D1, d2 is received by device D2, etc. Of the computed energy ratio vectors, the system 120 may determine at least one of the vectors that represents values that can be used to generate the spatial relationship data. Using the stored attenuation data, the system 120 may determine spatial relationship data that corresponds to the devices' locations.

To start, the system 120 may assume that the devices are located close to one another. In some embodiments, the spatial relationship data may be represented as a matrix. The system 120 may generate (step 302) a placeholder matrix of size N×N, where N is the number of devices within the household, hospital, business, assisted living facility, hotel, etc. The system 120 may set all of values in the placeholder matrix to 1.0. Such placeholder matrix represents the devices being located close to each other, with no measurable attenuation between each other.

The system 120 may then determine (step 304) a first attenuation vector. For example, the system 120 may select instances of stored attenuation data, corresponding a single instance of output device location request audio are detected by the device of the household, hospital, business, assisted living facility, hotel, etc., and determine a inter-device attenuation ratios between each pair of devices, i.e., the device that output the audio and each other device that detected the audio. The system 120 may determine which device the audio signal was generated close to, and then store (306) an intermediate matrix based on the first attenuation vector, i.e., in which values in the placeholder matrix are replaced with the inter-device attenuation ratios of the first attenuation vector. The system 120 may then select the next set of stored attenuation data, corresponding to another instance of output device location request audio, and perform similar steps to determine (step 308) a second attenuation vector.

To determine (step 310) whether the values in the intermediate matrix should be replaced with the attenuation ratios corresponding to the second attenuation vector, the sum total of the inter-device attenuation ratios is considered. The stored attenuation data, corresponding to a single instance of device location request audio, that results in a lower sum total (mass) than the instant intermediate matrix is used to replace the values in the intermediate matrix. The lower mass may be caused by a reduction in perceived inter-device attenuation. This approach is based on a numerical observation that the sum of factors for any value is minimum when the factors are equal to the square root of the value.

In an example embodiment, the system 120 may determine the first attenuation vector to include values between 0 and 1, and may be <A1, A2, . . . AN>. A device that does not 'hear' or receive the device location request audio would have an attenuation factor equal to 0.0. The device that is closest to where the device location request audio was output (that is the device closest to the device that output the device location request audio) would have the greatest attenuation factor compared to the other devices.

The system 120 may replace a row in the placeholder matrix using the first attenuation vector. The system 120 may determine to replace the row corresponding to the device that has the greatest attenuation factor. For example, if the first attenuation vector is <0.3, 0.8, 0.4, 0.5>, then device D2 has the greatest attenuation factor compared to the other devices. The system 120 may use the first attenuation vector to replace the row corresponding to D2 in the placeholder matrix. The system 120 may determine the inter-device attenuation factors with respect to D2 and corresponding to the first audio signal, and store those values in the matrix. The inter-device attenuation factor is the ratio of the attenuation factors of the respective device pair, for example, with respect to D2 the inter-device attenuation factors may be <A1/A2, A2/A2, A3/A2, A4/A2>. Thus, using the first attenuation vector of <0.3, 0.8, 0.4, 0.5>, the system 120 may determine the inter-device attenuation to be: <0.38, 1.0, 0.5, 0.63>. Assuming a placeholder matrix for four devices, after the first attenuation vector is determined, the placeholder matrix may be updated to generate the following example intermediate matrix:

|    | D1   | D2  | D3  | D4   |
|----|------|-----|-----|------|
| D1 | 1.0  | 1.0 | 1.0 | 1.0  |
| D2 | 0.38 | 1.0 | 0.5 | 0.63 |
| D3 | 1.0  | 1.0 | 1.0 | 1.0  |
| D4 | 1.0  | 1.0 | 1.0 | 1.0  |

In some embodiments, the system 120 may use the first attenuation vector to replace values in other rows and columns of the placeholder matrix.

The system 120 may then determine a second attenuation vector representing the attenuation factor experienced by each device with respect to a second instance of device location request audio. The system 120 may replace a row in the intermediate matrix using the second attenuation vector using the following decision steps.

The system 120 may test the second attenuation vector with respect to each row in the intermediate matrix. The system 120 may determine if using the second attenuation vector in the intermediate matrix decreases the sum total (mass) of a particular test row compared to the stored row values of the matrix. If the sum total of a test row does not decrease, then the system 120 determines that the second attenuation vector cannot be used to replace the values in that row. The system 120 then tests another row in the intermediate matrix. If the sum total decreases based on the second attenuation vector, then the system 120 may store an indication that the values in the test row may be replaced using the second attenuation vector. The system 120 may test other rows in the matrix, and may store indications of which test rows resulted in a decrease in the sum total. The system 120 may then select the test row that results in the greatest decrease in the sum total, and replace (step 312) the values in that test row based on the second attenuation vector.

For example, the system 120 may determine the inter-device attenuation factors with respect to D1 using the second attenuation vector, determine the sum total of the values, and compare it to the sum total of the stored values in the first row corresponding to D1. The system 120 may determine that the sum total is not decreased based on the second attenuation vector. The system 120 may then determine the inter-device attenuation factors with respect to D2 using the second attenuation vector, and compare it to the sum total of the stored values in the second row corresponding to D2. The system may determine that the sum total is decreased based on the second attenuation vector, and may store an indication that the row corresponding to D2 results in a sum total decrease and the amount of decrease. The system 120 may then test the row corresponding to D3. The system 120 may determine the inter-device attenuation factors with respect to D3 using the second attenuation vector, and compare it to the sum total of the stored values in the third row corresponding to D3. The system may determine that the sum total is decreased based on the second attenuation vector, and may store an indication that the row corresponding to D3 results in a sum total decrease and the amount of decrease. After testing the other rows in a similar manner, the system 120 may determine that the decrease in the sum total with respect to the D3 row is greater than the decrease in the sum total with respect to the D2 row. Based on this determination, the system 120 may determine to replace the values in the D3 row using the inter-device attenuation factors determined from the second attenuation vector.

After updating the values in the intermediate matrix, the system 120 may continue processing as described above with respect to other instances of device location request audio. If an attenuation vector corresponding to a stored signal does not decrease the sum total of any of the rows in the intermediate matrix, the system 120 may discard the attenuation vector and other data resulting from the processing and testing the stored audio signal.

In this manner, the system 120 may process stored attenuation data, and test the attenuation vectors, corresponding to the stored attenuation data, to generate the matrix. Starting with a placeholder matrix of 1.0 attenuation values, corresponds to a layout where the devices are located close to each other or at the same location. A decrease in the sum of the attenuation values indicates a layout where the devices are maximally distanced from each other.

In some embodiments, the system 120 may determine (step 314) whether the intermediate matrix is mature, e.g., whether the intermediate matrix represents the final matrix using values of the off-diagonal pairs. For any matrix element off-diagonal pair, when the values are equal, then they correspond to the value of the attenuation factor between the two devices. That is, when the attenuation ratio for the path from a first device to a second device is the same as the attenuation ratio for the path from the second device to the first device, then the intermediate matrix may represent the final matrix, i.e., the intermediate matrix may be considered "mature." The system 120 may store (step 318) the intermediate matrix as a final matrix (as the spatial relationship data of step 144 of FIG. 1A) for use with device targeting.

In some embodiments, the system 120 may determine a maturity metric indicating when the intermediate matrix is matured. In an example embodiment, the system 120 may determine that the values in the intermediate matrix substantially accurately represent a device's location relative to other devices. In some embodiments, as the intermediate matrix approaches maturity, the changes in the sum total become smaller as the system 120 processes and tests more stored attenuation data. However, a significant decrease in the sum total may occur due to abnormal noise or other factors, causing the system 120 to use the attenuation data to update the intermediate matrix. Thus, asymptotic changes in the sum total may be an indication in some embodiments of the matrix being ready for use.

The energy signal perceived by a device is a product of the attenuation factor and the microphone gain of the device. The energy ratio between two devices is the product of the inter-device attenuation factor and the ratio of the microphone gains of the two devices. The inter-device attenuation factors are used, as described above, to generate the final matrix. In some embodiments, the system 120 may determine that the intermediate matrix reached maturity using the microphone gain ratios. As the intermediate matrix reaches maturity, the microphone gain ratios may stabilize and become fixed values that represent the actual device gain ratio for a device pair.

In some embodiments, the system 120 may generate a gain ratio matrix representing the microphone gain ratios between respective device pairs. The gain ratio matrix may be generated by calculating the square root of the off-diagonal values of the matrix.

The gain ratio matrix includes $N^2$ elements (N is the number of devices), however, there are only N actual microphone gains. The system 120 may use the numerical redundancy in the gain ratio matrix to quantify a maturity metric for the matrix. For any two devices, there should be only one value for the gain ratio that is accurate. If multiple values are determined for the gain ratio using multiple energy signals that were evaluated to generate the matrix, then the values should agree if the matrix is mature. Since the actual gain ratio for the devices may not be known, the system 120 measures the variability in the gain ratio values to determine whether the matrix is mature. The system 120 determines that the actual gain ratio value lies between the range of the 'noisy' values, and that the average of the gain ratio values may represent a more accurate value for the actual gain ratio.

The system 120 may use an algorithm to determine the actual gain ratio. The algorithm may be configured to determine the actual gain ratio based on the input values including the actual gain ratio and a random noise value. The algorithm may process the multiple gain ratios and mitigate the random noise value to determine the actual gain ratio. The multiple gain ratios may correspond to different stored audio signals or processed audio signals.

In some embodiments, the system 120 may compare the values of a gain ratio of multiple device pairs to determine if the gain ratio for a particular device pair is accurate. For example, the gain ratio matrix includes G1/G2, G2/G3, G1/G3 and G1/G4, where GN represents the gain for the corresponding N device. The system 120, using the gain ratio matrix, may determine whether a gain ratio value is accurate or noisy. The system 120 may determine a calculated gain value for G3 using the ratios G1/G2 and G2/G3, and may compare the calculated gain value with the observed gain ratios that include G3. When the comparison results in the calculated value being the same as the observed value for G3, the system 120 may determine that the matrix satisfies a maturity metric.

Figure 4:
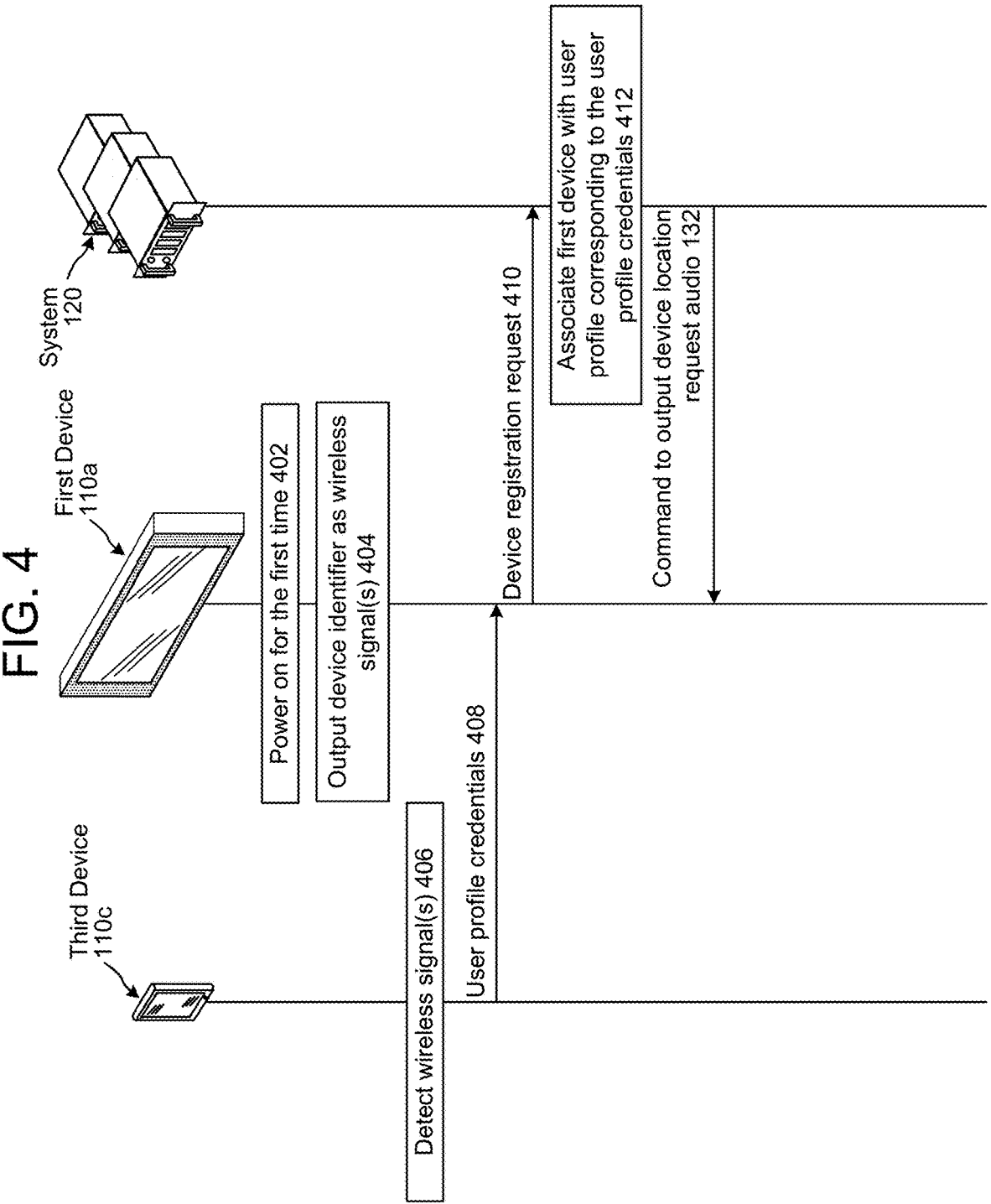
FIG. 4 is a signal flow diagram illustrating processing that may be performed as part of a device registration process, according to embodiments of the present disclosure.

Referring to FIG. 4, processing that may be performed as part of a device registration process is described. When a user purchases or otherwise comes into possession of the first device 110a, and the first device 110a becomes (step 402) powered on for the first time, the first device 110a may enter a device registration mode in which the first device 110a outputs (step 404) its device identifier as one or more wireless, e.g., Bluetooth, signals.

The user may use a third device 110c, e.g., a smart phone, tablet, or other device having an application installed thereon that allows the third device 110c to send data to and receive data from the system 120, to provide an input that a new device is to be associated with the user's profile. In response to this input, the third device 110c may detect (step 406) the aforementioned wireless signal(s) output by the first device 110a.

After detecting the wireless signal(s), the third device 110c may send (step 408), to the first device 110a, user profile credentials corresponding to the user's profile as stored by the system 120. For example, after detecting the wireless signal(s), the third device 110c may prompt the user to input a username and password that uniquely identifies the user to the system 120. In such situations, the user profile credentials may include the username and password.

After the third device 110c detects the wireless signal(s), the third device 110c may send, to the first device 110a, wireless connectivity data corresponding to a wireless network to which the first device 110a is to connect. The wireless connectivity data may include a name of the wireless network, and a password for accessing the wireless network if the wireless network is so configured. The first device 110a may then connect to the wireless network using the wireless network connectivity data.

After receiving the user profile credentials at step 408, and optionally after connecting to the wireless network, the first device 110a may send (step 410) a device registration request to the system 120. The device registration request may include the user profile credentials and a device identifier, e.g., a serial number, of the first device 110a. The device registration request may represent the device identifier is to be associated with user profile data corresponding to the user profile credentials.

In response to receiving the device registration request, the system 120 may associate (step 412) the first device 110a with the user profile corresponding to the user profile credentials. More particularly, the system 120 may associate the device identifier, of the first device 110a, with the user profile data associated with the user profile credentials.

After the system 120 has associated the first device 110a with the user profile, the system 120 may send (step 132), to the first device 110a, the command to output the device location request audio 11. Thereafter, the remaining processing, described with respect to FIG. 1A above, may be performed by the first device 110a, the second device 110b, and the system 120.

In some embodiments, after associating the first device 110a with the user profile at step 412 and prior to sending the command to the first device 110a at step 132, the system 120 may send, to the third device 110c, a command to output a request for user permission to determine a location of the first device 110a. In some embodiments, this command may instruct the third device 110c to use a push notification to display an information card request the user permission. If the provides the request via a voice user interface (VUI) or graphical user interface (GUI) user input, the third device 110c may send, to the system 120, data representing the user input, or an indication that the requested user permission was provided. In situations where the system 120 receives the data representing the user input, the system 120 may process the user input to determine the user input provides the requested user permission. After the system 120 determines the user permission was provided, or receives the indication from the third device 110c, the system 120 may send the command to the first device 110a at step 132. Thereafter, the remaining processing, described with respect to FIG. 1A above, may be performed by the first device 110a, the second device 110b, and the system 120.

Sometime after the first device 110a is associated with a user profile as described herein above, the first device 110a may output device location request audio 11 as part of activated and/or deactivating a do not disturb mode of the first device 110a. As used herein, a "do not disturb mode" refers to a device configuration in which a device is configured to not send data to the system 120, and either receive data from the system 120 but not output said data, or not receive data from the system 120.

The first device 110a may receive a first user input requesting activation of a do not disturb mode. For example, the first user input may be the selection of a "do not disturb" button of or displayed by the first device 110a.

In response to receiving the first user input, the first device 110a may enter the do not disturb mode. In some embodiments, this may include the first device 110a shutting off power to the microphone(s) of the first device 110a, assuming the first device 110a is configured with a microphone(s). Moreover, the first device 110a may output first audio indicating do not disturb mode has been activated, where the first audio includes the device location request audio 11.

The first device 110a may send to the system 120, data indicating the first device 110a has output the device location request audio 11. By receiving this data, the system 120 may determine the first device 110a output the device location request audio 11, as described with respect to step 142 of FIG. 1A herein above, in response to receiving the device location request detection data from the second device 110b, as described with respect to step 138 of FIG. 1A herein above.

Sometime after outputting the first audio at step XXB06, the first device 110a may receive a second user input requesting deactivation of the do not disturb mode. For example, the second user input may be the selection of the "do not disturb" button of or displayed by the first device 110a.

In response to receiving the second user input, the first device 110a may exit the do not disturb mode. In some embodiments, this may include the first device 110a restoring power to the microphone(s) of the first device 110a, assuming the first device 110a is configured with a microphone(s). Moreover, the first device 110a may output second audio indicating do not disturb mode has been deactivated, where the second audio includes the device location request audio 11.

The first device 110a may send to the system 120, data indicating the first device 110a has output the device location request audio 11. By receiving this data, the system 120 may determine the first device 110a output the device location request audio 11, as described with respect to step 142 of FIG. 1A herein above, in response to receiving the device location request detection data from the second device 110b, as described with respect to step 138 of FIG. 1A herein above.

In some embodiments, the first device 110a may be configured to output the device location request audio 11 in response to a button on or displayed by the first device 110a being selected by a user. For example, the first device 110a may output the device location request audio 11 in response to a volume up or volume down button being selected. In such example, the first device 110a may output the device location request audio 11 at a volume corresponding to a result of the volume up/down request. In this example, the first device 110a may send to the system 120, data indicating the first device 110a has output the device location request audio 11. By receiving this data, the system 120 may determine the first device 110a output the device location request audio 11, as described with respect to step 142 of FIG. 1A herein above, in response to receiving the device location request detection data from the second device 110b, as described with respect to step 138 of FIG. 1A herein above.

Figure 5:
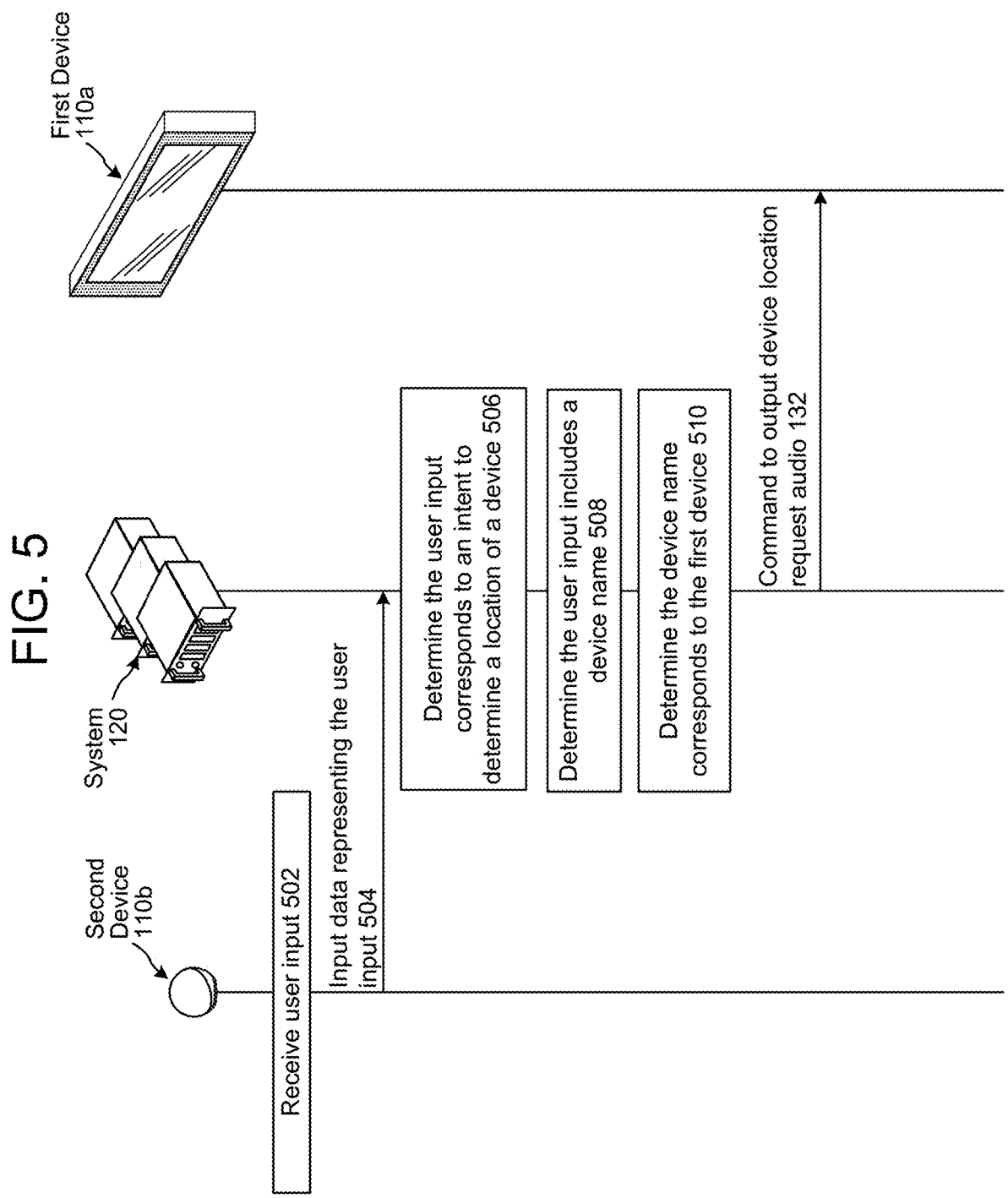
FIG. 5 is a signal flow diagram illustrating processing that may be performed when a user provides, to one device, a user input requesting a location of another device be determined, according to embodiments of the present disclosure.

FIG. 5 illustrates processing that may be performed when a user provides, to one device, a user input request a location of another device be determined. The second device 110b may receive (step 502) a user input. In some embodiments, the user input may be a spoken natural language input.

The second device 110*b* may send (step 504), to the system 120, input data representing the user input. In embodiments where the user input is a spoken natural language input, the input data may be input audio data corresponding to the audio of the spoken natural language input.

The system 120 may determine (step 506) that the user input corresponds to an intent to determine a location of a device. In embodiments where the input data is input audio data, the system 120 may perform ASR processing, described in detail herein below, to determine ASR output data representing the input audio data, and may perform intent classification (IC) processing, a part of natural language understanding (NLU) processing as described in detail herein below, to determine the user input corresponds to the intent to determine a location of a device. Alternatively, the system 120 may perform spoken language understanding (SLU) processing on the input audio data to determine the intent, without determining the ASR output data as an intermediate.

The system 120 may also determine (step 508) that the user input includes a device name. In embodiments where the input data is input audio data, the system 120 may perform ASR processing to determine ASR output data representing the input audio data, and may perform named entity recognition (NER) processing, a part of NLU processing as described in detail herein below, to determine the user input includes the device name. Alternatively, the system 120 may perform spoken language understanding (SLU) processing on the input audio data to determine the user input includes the device name, without determining the ASR output data as an intermediate.

The system 120 may determine (step 510) that the device name corresponds to the first device 110*a*. For example, the system 120 may determine user profile data and/or group profile data associated with the second device 110*b*, e.g., associated with a device identifier of the second device 110*b*, and determine the device name, as represented in the user input, is associated with a device identifier, of the first device 110*a*, associated with the user profile data and/or group profile data.

In response to determining the device name corresponds to the first device, the system 120 may send (step 132), to the first device, the command to output the device location request audio 11. Thereafter, the remaining processing, described with respect to FIG. 1A above, may be performed by the first device 110*a*, the second device 110*b*, and the system 120.

In some embodiments, the user may provide, to the first device 110*a*, a user input to determine a location of the first device 110*a*. For example, the user input may be the spoken natural language input "Alexa, determine a location of this device." The first device 110*a* may send input data, e.g., input audio data, of the user input to the system 120, and the system 120 may process the input data to determine the user input requests a location of the first device 110*a* be determined. The system 120 may make the foregoing determination based on receiving the input data from the first device 110*a*, and based on the user input, as represented in the input data, including the words "this device."

Figure 6:
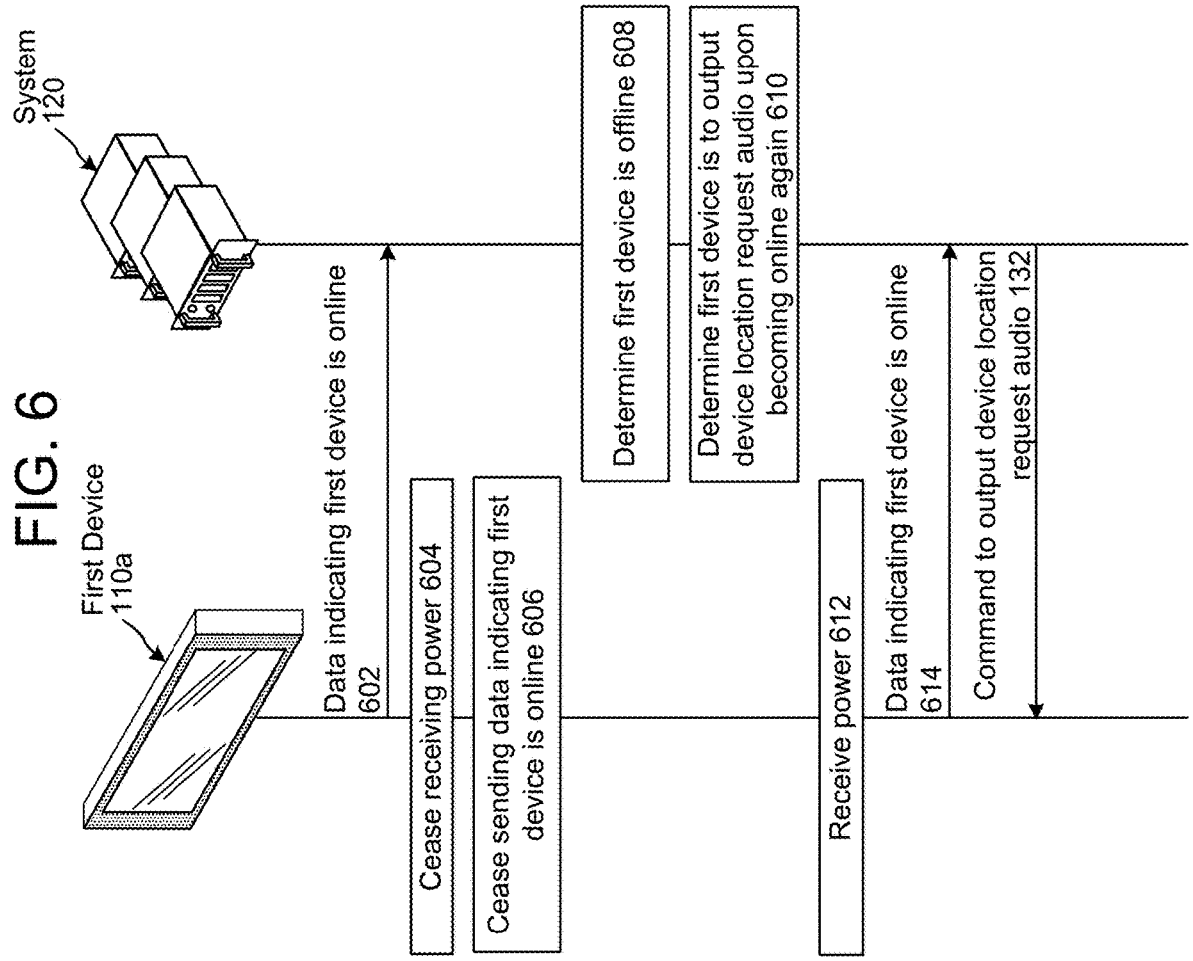
FIG. 6 is a signal flow diagram illustrating how device location request audio may be output based on a device rebooting, according to embodiments of the present disclosure.

FIG. 6 illustrates how the device location request audio 11 may be output based on the first device 110*a* rebooting. As used herein, a "reboot" of a device refers to a device being powered off and then re-powered on thereafter. A reboot may occur for various reasons, e.g., as part of a software update, due to the device being plugged in to an outlet of a building that loses power, due to a user unplugging the device and thereafter plugging the device back in, etc.

The first device 110*a* may be configured to, while the first device 110*a* is powered on, periodically send (step 602), to the system 120, data indicating the first device 110*a* is online, i.e., that the first device 110*a* is capable of sending data to and receiving data from the system 120. At some point, the first device 110*a* may cease (step 604) receiving power and, as a result, cease (step 606).

Based on not receiving the data indicating the first device 110*a* is online, the system 120 may determine (step 608) that the first device 110*a* is offline, i.e., that the first device 110*a* is unable to send data to and receive data from the system 120. Based on determining the first device 110*a* is offline, the system 120 may determine (step 610) that the first device is to output the device location request audio 11 upon becoming online again.

Sometime after the system 120 determines the first device 110*a* is to output the device location request audio 11, the first device 110*a* may receive (step 612) power again. As a result of receiving power again, the device 110*a* may again periodically send (step 614), to the system 120, data indicating the first device 110*a* is online.

Based on receiving the data at step 614, the system 120 may send (step 132), to the first device 110*a*, the command to output the device location request audio 11. Thereafter, the remaining processing, described with respect to FIG. 1A above, may be performed by the first device 110*a*, the second device 110*b*, and the system 120.

In some embodiments, the system 120 may only send the command, at step 132 in FIG. 6, if the first device 110*a* is offline for at least a certain amount of time. For example, the system 120 may store a first timestamp of when the first device 110*a* ceased sending the data indicating the first device 110*a* is online, and may store a second timestamp of when the first device 110*a* again sent the data indicating the first device 110*a* was online again. The system 120 may determination a duration of time between the first timestamp and the second timestamp, and may compare the duration of time to a threshold duration of time. If the system 120 determines the duration of time fails to satisfy, e.g., fails to meet or exceed, the threshold duration of time, the system 120 may determine the command of step 132 should not be sent to the first device 110*a*. Conversely, if the system 120 determines the duration of time satisfies, e.g., meets or exceeds, the threshold duration of time, the system 120 may send the command of step 132.

In some embodiments, the system 120 may only send the command, at step 132 in FIG. 6, at certain times, e.g., not between 9 pm and 8 am the following morning. For example, when the system 120 again receives the data at step 614, the system 120 may determine a present time. The system 120 may determine whether the present time corresponds to a time frame in which the device location request audio 11 is permitted to be output, or a whether the present time corresponds to a time frame in which the device location request audio 11 is not permitted to be output. If the system 120 determines the present time corresponds to a time frame in which the device location request audio 11 is not to be output, the system 120 may determine the command of step 132 should not be sent to the first device 110*a*. Conversely, if the system 120 determines the present time corresponds to a time frame in which the device location request audio 11 is permitted to be output, the system 120 may send the command of step 132.

It will be appreciated that the first device 110a may be configured to be continually powered on, but that the first device 110a may not be interacted with by a user until the user turns the first device 110a on, e.g., by selecting a power button on the first device 110a or by selecting a power button on a remote associated with the first device 110a. In some embodiments, the first device 110a may be configured to output the device location request audio 11 each time the first device 110a is turned on. In some embodiments, the first device 110a may be configured to output the device location request audio 11 every n number of times the first device 110a is turned on. In some embodiments, the first device 110a may be configured to output the device location request audio 11 periodically, e.g., once a day, once a week, once a month, etc. Each time the first device 110a outputs the device location request audio 11, the first device 110a may send, to the system 120, data indicating the first device 110a output the device location request audio 11. By receiving this data, the system 120 may determine the first device 110a output the device location request audio 11, as described with respect to step 142 of FIG. 1A herein above, in response to receiving the device location request detection data from the second device 110b, as described with respect to step 138 of FIG. 1A herein above.

It will be appreciated that the processing, described above with respect to FIG. 6, is applicable in other contexts. For example, the processing of FIG. 6 may be applicable in other instances where the system 120 ceases receiving data from the first device 110a, and later again receives data from the first device 110a. Such situations includes, but are not limited to when the first device 110a enters a standby or other low-power mode.

In some situations, the first device 110a may be configured to perform Wi-Fi round-trip time measurements (RTTMs), in accordance with IEEE 802.11 mc, to measure distances of the first device 110a with respect to nearby Wi-Fi access points. In some embodiments, the first device 110a may be configured to determine its physical location has changed based on one or more RTTMs changing. In such embodiments, based on determining its physical location has changed, the first device 110a may output the device location request audio 11, and send, to the system 120, data indicating the first device 110a has output the device location request audio 11. By receiving this data, the system 120 may determine the first device 110a output the device location request audio 11, as described with respect to step 142 of FIG. 1A herein above, in response to receiving the device location request detection data from the second device 110b, as described with respect to step 138 of FIG. 1A herein above.

Wi-Fi Received Signal Strength Indicator (RSSI) may be used to measure the power present in a radio signal sent from a Wi-Fi access point to a device. As radio wave attenuate according to the inverse-square law, the distance between the Wi-Fi access point and the device can be approximated. In some embodiments, the first device 110a may be configured to determine its physical location using Wi-Fi RSSI as known in the art. In some embodiments, the first device 110a may be configured to determine its physical location has changed based on one or more Wi-Fi RSSIs changing. In such embodiments, based on determining its physical location has changed, the first device 110a may output the device location request audio 11, and send, to the system 120, data indicating the first device 110a has output the device location request audio 11. By receiving this data, the system 120 may determine the first device 110a output the device location request audio 11, as described with respect to step 142 of FIG. 1A herein above, in response to receiving the device location request detection data from the second device 110b, as described with respect to step 138 of FIG. 1A herein above.

In some embodiments, the spatial relationship data, generated at step 144 in FIG. 1A, may be associated with a decay function. The decay function may indicate a duration of time that the spatial relationship data is valid for. After the duration of time has expired, the system 120 may delete the spatial relationship data, or may cease using the spatial relationship data to determine which device is to be used to output a response to a user input. Each time the first device 110a outputs the device location request audio 11, the decay function of the spatial relationship data may be reset, resulting in the spatial relationship data again being valid for the duration of time associated with the decay function. Such may allow a confidence, of the system 120, in the spatial relationship data to be maintained over a significant amount of time.

In some embodiments, the system 120 may store the Internet Protocol (IP) address of the first device 110a. In some embodiments, if the system 120 determines the IP address of the first device 110a has changed, the system 120 may send, to the first device 110a, the command to output the device location request audio 11.

In some situations, a user may associate the first device 110a with a name indicating a location of the first device 110a. For example, the user may include the words kitchen, living room, bedroom, hallway, office, etc. in the name of the first device 110a. The system 120 may store the name of the first device 110a in user profile data associated with a user of the first device 110a, in group profile data associated with a group of users of the first device 110a, or device profile data corresponding to the first device 110a. A user may also change the name of the first device 110a. In some situations, the name of the first device 110a may change to include a different location identifier, e.g., a different one of kitchen, living room, bedroom hallway, office, etc. In some embodiments, the system 120 may determine when the name of the first device 110a has been changed to include a different location identifier and, based thereon, may send, to the first device 110a, a command to output the device location request audio 11.

In some embodiments, the first device 110a may send, to the system 120, data representing a present Wi-Fi signal strength experienced by the first device 110a. The system 120 may store a log of Wi-Fi signal strengths sent to the system 120 by the first device 110a. In some situations, a change in Wi-Fi signal strength may indicate the first device 110a has been physically moved. Thus, in some embodiments, if the system 120 determines two Wi-Fi signal strengths have changed by at least a threshold amount, the system 120 may send, to the first device 110a, a command to output the device location request audio 11. As an example, the system 120 may receive, from the first device 110a, data representing a first Wi-Fi signal strength experienced by the first device 110a; receive, from the first device 110a, data representing a second Wi-Fi signal strength experienced by the first device 110a; determine the first Wi-Fi signal strength is different from the second Wi-Fi signal strength by at least a threshold amount; and send to the first device 110a and based on the first Wi-Fi signal strength being different from the second Wi-Fi signal strength by at least the threshold amount, the command at step 132 to output the device location request audio 11.

In some embodiments, prior to sending, to the first device 110a, the command to output the device location request audio 11, the system 120 may confirm with a user that a physical location of the first device 110a has changed. In some embodiments, the system 120 may determine a smart phone, tablet, or the like device associated with the first device 110a in user profile data or group profile data, and may send, to the smart phone, tablet, or the like a command to use a push notification to display an information card requesting confirmation that the first device 110a has been moved.

In some embodiments, more than one criteria must be satisfied prior to the system 120 sending, to the first device 110a, the command to output the device location request audio 11. For example, in some embodiments, the system 120 may require the first device 110a go offline and come back online, and the name of the first device 110a be changed to include a different location indicator, in order for the system 120 to determine the command is to be sent to the first device 110a. It will be appreciated that other combinations of criteria for sending the command, as described in detail herein, may be used by the system 120.

Figure 7:
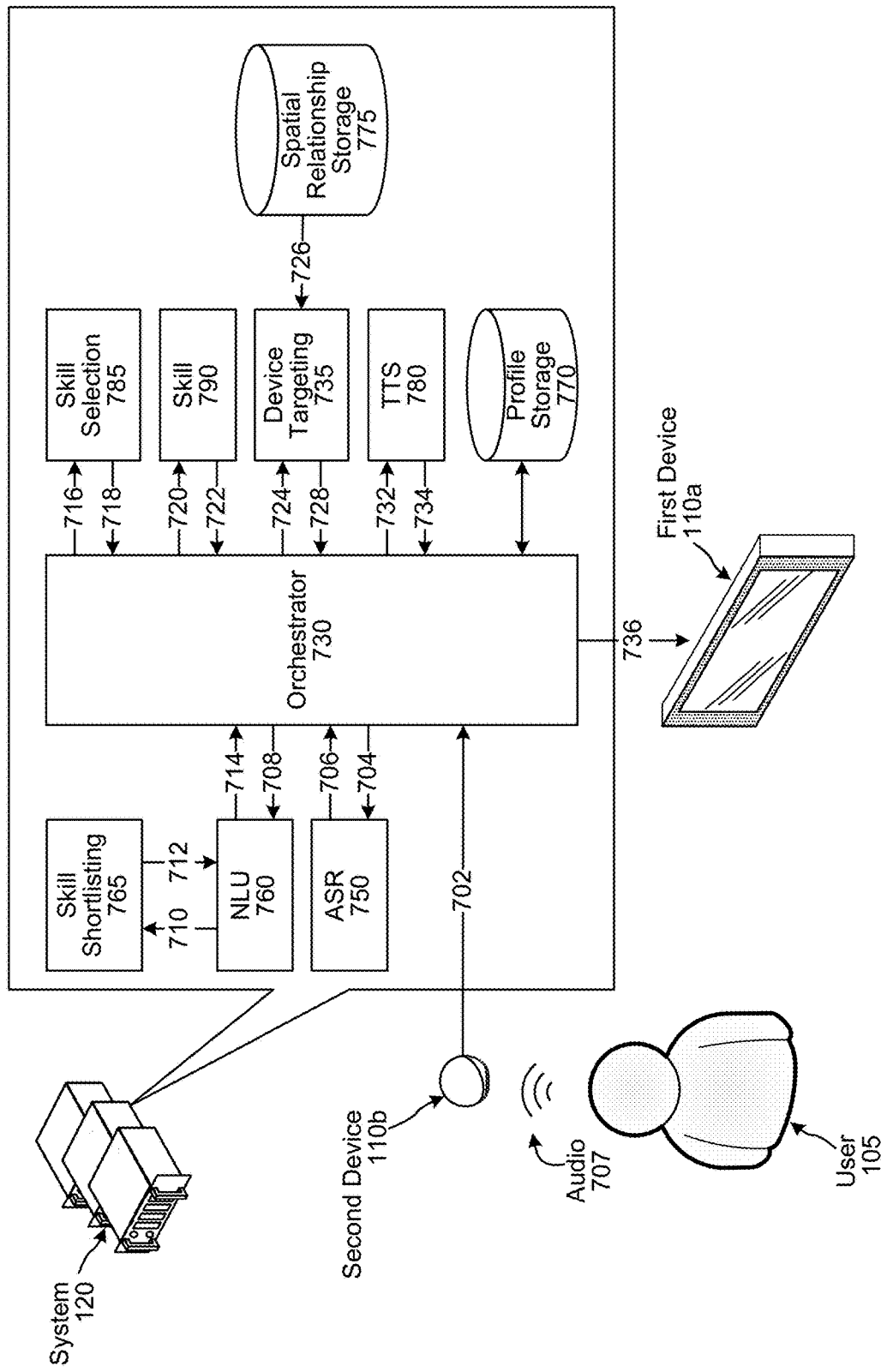
FIG. 7 is a conceptual diagram illustrating processing that may be performed in response to a user input, according to embodiments of the present disclosure.

Referring to FIG. 7, sometime after the spatial relationship data is generated at step 144 in FIG. 1A, the second device 110b may receive an input from a user 105. For example, the user 105 may speak the input, and the device 110 may capture audio 707 representing the spoken natural language input. The device 110 may generate input data corresponding to the user input, e.g., input audio data corresponding to the spoken natural language input, and may send (step 702) the input data to the system 120. In some embodiments, the second device 110b may send the input data in response to the VAD component 175, illustrated in and described above with respect to FIG. 1A, detecting speech in the audio 707, and the wake word detection component 180, illustrated in and described above with respect to FIG. 1A, determining the speech includes a wake word indicating the speech includes the spoken natural language input.

The system 120 may include various components. Example, non-limiting components include an orchestrator component 730, an automatic speech recognition (ASR) component 750, a natural language understanding (NLU) component 760, a skill shortlisting component 765, a skill selection component 785, one or more skill components (illustrated as skill component 790), a device targeting component 735, a 7 spatial relationship storage 775, a text-to-speech (TTS) component 780, and a profile storage 770.

The orchestrator component 730 may receive the input data. In situations where the input data is input audio data, the orchestrator component 730 may send (step 704) the input audio data to the ASR component 750. The ASR component 750 may process the input audio data to determine ASR output data including one or more ASR hypotheses corresponding to the words included in the spoken user input. An ASR hypothesis may be configured as a textual interpretation of the words, or may be configured in another manner, such as one or more tokens. Each ASR hypothesis may represent a different likely interpretation of the words spoken in the input audio data. Each ASR hypothesis may be associated with a score representing a confidence of ASR processing performed to determine the ASR hypothesis with which the score is associated.

The ASR component 750 interprets the speech in the input audio data based on a similarity between the audio data and pre-established language models. For example, the ASR component 750 may compare the input audio data with models for sounds (e.g., subword units, such as phonemes, etc.) and sequences of sounds to identify words that match the sequence of sounds of the speech represented in the input audio data.

The ASR component may send (step 706) the ASR output data to the orchestrator component 730. In turn, the orchestrator component 730 may send (step 708) the ASR output data to the NLU component 760. The NLU component 760 may, in turn, send (step 710) the ASR output data to the skill shortlisting component 765.

The skill shortlisting component 765 is configured to determine a subset of skill components, executed by or in communication with the system 120, that may perform an action responsive to the spoken user input. Without the skill shortlisting component 765, the NLU component 760 may process ASR output data input thereto with respect to every skill component of or in communication with the system 120. By implementing the skill shortlisting component 765, the NLU component 760 may process ASR output data with respect to only the skill components that are likely to execute with respect to the user input. This reduces total compute power and latency attributed to NLU processing.

The skill shortlisting component 765 may include one or more ML models. The ML model(s) may be trained to recognize various forms of user inputs that may be received by the system 120. For example, during a training period, a skill component developer may provide training data representing sample user inputs that may be provided by a user to invoke the skill component. For example, for a ride sharing skill component, a skill component developer may provide training data corresponding to "get me a cab to [location]," "get me a ride to [location]," "book me a cab to [location]," "book me a ride to [location]," etc.

The system 120 may use the sample user inputs, provided by a skill component developer, to determine other potentially related user input structures that users may try to use to invoke the particular skill component. The ML model(s) may be further trained using these potentially related user input structures. During training, the skill component developer may be queried regarding whether the determined other user input structures are permissible, from the perspective of the skill component developer, to be used to invoke the skill component. The potentially related user input structures may be derived by one or more ML models, and may be based on user input structures provided by different skill component developers.

The skill component developer may also provide training data indicating grammar and annotations.

Each ML model, of the skill shortlisting component 765, may be trained with respect to a different skill component. Alternatively, the skill shortlisting component 765 may implement one ML model per domain, such as one ML model for skill components associated with a weather domain, one ML model for skill components associated with a ride sharing domain, etc.

The sample user inputs provided by a skill component developer, and potentially related sample user inputs determined by the system 120, may be used as binary examples to train a ML model associated with a skill component. For example, some sample user inputs may be positive examples, e.g., user inputs that may be used to invoke the skill component. Other sample user inputs may be negative examples, e.g., user inputs that may not be used to invoke the skill component.

As described above, the skill shortlisting component 765 may include a different ML model for each skill component, a different ML model for each domain, or some other combination of ML models. In some embodiments, the skill shortlisting component 765 may alternatively include a single ML model. This ML model may include a portion trained with respect to characteristics, e.g., semantic characteristics, shared by all skill components. The ML model may also include skill component-specific portions, with each skill component-specific portion being trained with respect to a specific skill component. Implementing a single ML model with skill component-specific portions may result in less latency than implementing a different ML model for each skill component because the single ML model with skill component-specific portions limits the number of characteristics processed on a per skill component level.

The portion, trained with respect to characteristics shared by more than one skill component, may be clustered based on domain. For example, a first portion, of the portion trained with respect to multiple skill components, may be trained with respect to weather domain skill components; a second portion, of the portion trained with respect to multiple skill components, may be trained with respect to music domain skill components; a third portion, of the portion trained with respect to multiple skill components, may be trained with respect to travel domain skill components; etc.

The skill shortlisting component 765 may make binary, e.g., yes or no, determinations regarding which skill components relate to the ASR output data. The skill shortlisting component 765 may make such determinations using the one or more ML models described herein above. If the skill shortlisting component 765 implements a different ML model for each skill component, the skill shortlisting component 765 may run the ML models that are associated with enabled skill components as indicated in a user profile associated with the device 110 and/or the user 105.

The skill shortlisting component 765 may generate an n-best list of skill components that may execute with respect to the user input represented in the ASR output data. The size of the n-best list of skill components is configurable. In an example, the n-best list of skill components may indicate every skill component of, or in communication with, the system 120 as well as contain an indication, for each skill component, representing whether the skill component is likely to execute the user input represented in the ASR output data. In another example, instead of indicating every skill component, the n-best list of skill components may only indicate the skill components that are likely to execute the user input represented in the ASR output data. In yet another example, the skill shortlisting component 765 may implement thresholding such that the n-best list of skill components may indicate no more than a maximum number of skill components. In another example, the skill components included in the n-best list of skill components may be limited by a threshold score, where only skill components associated with a likelihood to handle the user input above a certain score are included in the n-best list of skill components.

The ASR output data may correspond to more than one ASR hypothesis. When this occurs, the skill shortlisting component 765 may output a different n-best list of skill components for each ASR hypothesis. Alternatively, the skill shortlisting component 765 may output a single n-best list of skill components representing the skill components that are related to the multiple ASR hypotheses represented in the ASR output data.

As indicated above, the skill shortlisting component 765 may implement thresholding such that an n-best list of skill components output therefrom may include no more than a threshold number of entries. If the ASR output data includes more than one ASR hypothesis, the n-best list of skill components may include no more than a threshold number of entries irrespective of the number of ASR hypotheses output by the ASR component 450. Additionally or alternatively, the n-best list of skill components may include no more than a threshold number of entries for each ASR hypothesis, e.g., no more than five entries for a first ASR hypothesis, no more than five entries for a second ASR hypothesis, etc.

Additionally or alternatively to making a binary determination regarding whether a skill component potentially relates to the ASR output data, the skill shortlisting component 765 may generate confidence scores representing likelihoods that skill components relate to the ASR output data. The skill shortlisting component 765 may perform matrix vector modification to obtain confidence scores for all skill components in a single instance of processing of the ASR output data.

An n-best list of skill components including confidence scores that may be output by the skill shortlisting component 765 may be represented as, for example:
  Story skill component, 0.67
  Recipe skill component, 0.62
  Information skill component, 0.57
  Shopping skill component, 0.42

As indicated, the confidence scores output by the skill shortlisting component 765 may be numeric values. The confidence scores output by the skill shortlisting component 765 may alternatively be binned values (e.g., high, medium, low).

The n-best list of skill components may only include entries for skill components having a confidence score satisfying, e.g., meeting or exceeding, a minimum threshold confidence score. Alternatively, the skill shortlisting component 765 may include entries for all skill components associated with enabled skill components of the current user, even if one or more of the skill components are associated with confidence scores that do not satisfy the minimum threshold confidence score.

The skill shortlisting component 765 may consider other data when determining which skill components may relate to the user input represented in the ASR output data as well as respective confidence scores. The other data may include usage history data, data indicating the skill components that are enabled with respect to the device 110 and/or user 105, data indicating a device type of the device 110, data indicating a speed of the device 110, a location of the device 110, data indicating a skill component that was being used to output content via the device 110 when the device 110 received the instant user input, etc.

The thresholding implemented with respect to the n-best list if skill components generated by the skill shortlisting component 765 as well as the different types of other data considered by the skill shortlisting component 765 are configurable.

The skill shortlisting component 765 sends (step 712) the plurality of skill component identifiers to the NLU component 760. The NLU component 760 process the ASR output data with respect to the plurality of skill component identifiers to determine NLU output data including one or more NLU hypotheses. Each NLU hypothesis may be associated with a respective skill component represented in the skill component identifiers output by the skill shortlisting component 765.

The NLU component 760 may perform intent classification (IC) processing on the ASR output data to determine an intent of the user input. An intent corresponds to an action responsive to the user input. To perform IC processing, the NLU component 760 may communicate with a database of words linked to intents. For example, a music intent database may link words and phrases such as "quiet," "volume off," and "mute" to a <Mute> intent. The NLU component 760 identifies intents by comparing words and phrases in the ASR output data to the words and phrases in an intents database. In some embodiments, the NLU component 760 may communicate with multiple intents databases, with each intents database corresponding to one or more intents associated with a particular skill component.

For example, IC processing of the user input "play my workout playlist" may determine an intent of <PlayMusic>. For further example, IC processing of the user input "call mom" may determine an intent of <Call>. In another example, IC processing of the user input "call mom using video" may determine an intent of <VideoCall>. In yet another example, IC processing of the user input "what is today's weather" may determine an intent of <OutputWeather>.

The NLU component 760 may also perform named entity recognition (NER) processing on the ASR output data to determine one or more portions, sometimes referred to as slots, of the user input that may be needed for post-NLU processing, e.g., processing performed by a skill component. For example, NER processing of the user input "play [song name]" may determine an entity type of "SongName" and an entity value corresponding to the indicated song name. For further example, NER processing of the user input "call mom" may determine an entity type of "Recipient" and an entity value corresponding to "mom." In another example, NER processing of the user input "what is today's weather" may determine an entity type of "Date" and an entity value of "today."

In some embodiments, an intent may be linked to one or more entity types to be populated with entity values. For example, a <PlayMusic> intent may be associated with an "artist name" entity type, an "album name" entity type, and/or a "song name" entity type.

For example, the NLU component 760 may perform NER processing to identify words in ASR output data as subject, object, verb, preposition, etc. based on grammar rules and/or models. Then, the NLU component 760 may perform IC processing using the identified verb to identify an intent. Thereafter, the NLU component 760 may again perform NER processing to determine the entity type(s) associated with the identified intent. For example, a model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data using heuristic grammar rules, or a model may be constructed using techniques such as hidden Markov models, maximum entropy models, log linear models, conditional random fields (CRFs), and the like. For example, NER processing with respect to a music skill component may include parsing and tagging ASR output data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill component, which IC processing determines corresponds to a <PlayMusic> intent.

The NLU component 760 may generate NLU output data including one or more NLU hypotheses, where each NLU hypothesis includes an intent and optionally one or more entity types and corresponding entity values. In some embodiments, a NLU hypothesis may be associated with a score representing a confidence of NLU processing performed to determine the NLU hypothesis with which the score is associated.

The NLU component 760 may also perform domain classification (DC) processing to determine a domain corresponding to the user input. As used herein, a "domain" may refer to a collection of related functionality. A domain may be associated with one or more skill components performing related functionality. A non-limiting list of domains includes a smart home domain (corresponding to smart home functionality), a music domain (corresponding to music functionality), a video domain (corresponding to video functionality), a weather domain (corresponding to weather functionality), a communications domain (corresponding to one- or two-way communications functionality), and a shopping domain (corresponding to shopping functionality).

As described above, speech processing may be performed using two different components, i.e., the ASR component 750 and the NLU component 760. In some embodiments, a spoken language understanding (SLU) component may be configured to process audio data to determine NLU output data.

The SLU component may be equivalent to a combination of the ASR component 750 and the NLU component 760. Yet, the SLU component may process audio data and directly determine the NLU output data, without an intermediate step of generating ASR output data. As such, the SLU component may take audio data representing speech and attempt to make a semantic interpretation of the speech. The SLU component may output NLU output data including a most likely NLU hypothesis, or multiple NLU hypotheses associated with respective confidence or other scores (such as probability scores, etc.).

The NLU component 760 sends (step 714) the NLU output data to the orchestrator component 730. In turn, the orchestrator component 730 may send (step 716) the NLU output data to the skill selection component 785.

The skill selection component 785 is configured to determine a skill component to execute to respond to the user input. The skill selection component 785 may include a skill component proposal component, a skill component pre-response component, and a skill component ranking component.

The skill component proposal component is configured to determine skill components capable of processing in response to the user input. In addition to receiving the NLU output data, the skill component proposal component may receive context data corresponding to the user input. For example, the context data may indicate a skill component that was causing the device 110 to output content, e.g., music, video, synthesized speech, etc., when the device 110 captured the user input, one or more skill components that are indicated as enabled in a profile (as stored in the profile storage 770) associated with the user 105, output capabilities of the device 110, a geographic location of the device 110, and/or other context data corresponding to the user input.

The skill component proposal component may implement skill component proposal rules. A skill component developer, via a skill component developer device, may provide one or more rules representing when a skill component should be invoked to respond to a user input. In some embodiments, such a rule may be specific to an intent. In such embodiments, if a skill component is configured to execute with respect to multiple intents, the skill component may be associated with more than one rule, e.g., each rule corresponding to a different intent capable of being handled by the skill component. In addition to being specific to an intent, a rule may indicate one or more entity identifiers with respect to which the skill component should be invoked. For further example, a rule may indicate output capabilities of a device, a geographic location, and/or other conditions.

Each skill component may be associated with each rule corresponding to the skill component. As an example, a rule may indicate a video skill component may execute when a user input corresponds to a "PlayVideo" intent and the device includes or is otherwise associated with a display. As another example, a rule may indicate a music skill component may execute when a user input corresponds to a "PlayMusic" intent and music is being output by a device when the device captures the user input. It will be appreciated that other examples are possible. The foregoing rules enable skill components to be differentially proposed at runtime, based on various conditions, in systems where multiple skill components are configured to execute with respect to the same intent.

The skill component proposal component, using the NLU output data, received context data, and the foregoing described skill component proposal rules, determines skill components configured to process in response to the user input. Thus, in some embodiments, the skill component proposal component may be implemented as a rules engine. In some embodiments, the skill component proposal component may make binary, e.g., yes/no, true/false, etc., determinations regarding whether a skill component is configured to process in response to the user input. For example, the skill component proposal component may determine a skill component is configured to process, in response to the user input, if the skill component is associated with a rule corresponding to the intent, represented in the NLU output data, and the context data.

In some embodiments, the skill component proposal component may make such binary determinations with respect to all skill components. In some embodiments, the skill component proposal component may make the binary determinations with respect to only some skill components, e.g., only skill components indicated as enabled in the user profile of the user 105.

After the skill component proposal component is finished processing, the skill component pre-response component may be called to execute. The skill component pre-response component is configured to query skill components, determined by the skill component proposal component as configured to process the user input, as to whether the skill components are in fact able to respond to the user input. The skill component pre-response component may take as input the NLU output data including one or more NLU hypotheses, where each of the one or more NLU hypotheses is associated with a particular skill component determined by the skill component proposal component as being configured to respond to the user input.

The skill component pre-response component sends a pre-response query to each skill component determined by the skill component proposal component. A pre-response query may include the NLU hypothesis associated with the skill component, and optionally other context data corresponding to the user input.

A skill component may determine, based on a received pre-response query and optionally other data available to the skill component, whether the skill component is capable of respond to the user input. For example, a skill component may generate a pre-response indicating the skill component can respond to the user input, indicating the skill component needs more data to determine whether the skill component can respond to the user input, or indicating the skill component cannot respond to the user input.

In situations where a skill component's pre-response indicates the skill component can respond to the user input, or indicating the skill component needs more information, the skill component's pre-response may also include various other data representing a strength of the skill component's potential response to the user input. Suh other data may positively influence the skill component's ranking by the skill component ranking component of the skill selection component 785. For example, such other data may indicate capabilities, e.g., output capabilities or components such as a connected screen, loudspeaker, etc., of a device to be used to output the skill component's response; pricing data corresponding to a product or service the user input is requesting be purchased or is requesting information for; availability of a product the user input is requesting be purchased; whether there are shipping fees for a product the user input is requesting be purchased; whether the user 105 already has a profile and/or subscription with the skill component; that the user 105 does not have a subscription with the skill component, but that there is a free trial/tier the skill component is offering; with respect to a taxi skill component, a cost of a trip based on start and end locations, how long the user 105 would have to wait to be picked up, etc.; and/or other data available to the skill component that is related to the skill component's processing of the user input. In some embodiments, a skill component's pre-response may include an indicator, e.g., flag, representing a strength of the skill component's ability to personalize its response to the user input.

In some embodiments, a skill component's pre-response may be configured to a pre-defined schema. By requiring pre-responses to conform to a specific schema, e.g., by requiring skill components to only be able to provide certain types of data in pre-responses, new skill components may be onboarded into the skill component selection functionality without needing to reconfigure the skill selection component 785 each time a new skill component is onboarded. Moreover, requiring pre-responses to conform to a schema limits the amount of values needed to be used to train and implement a ML model for ranking skill components.

After the skill component pre-response component queries the skill components for pre-responses, the skill component ranking component may be called to execute. The skill component ranking component may be configured to select a single skill component, from among the skill components determined by the skill component proposal component, to respond to the user input. In some embodiments, the skill component ranking component may implement a ML model. In some embodiments, the ML model may be a deep neural network (DNN).

The skill component ranking component may take as input the NLU output data, the skill component pre-responses, one or more skill component preferences of the user 105, e.g., as represented in a user profile or group profile stored in the profile storage 770, NLU confidence scores of the NLU output data, a device type of the device 110, data indicating whether the device 110 was outputting content when the user input was received, and/or other context data available to the skill component ranking component.

The skill component ranking component ranks the skill components using the ML model. Things that may increase a skill component's ranking include, for example, that the skill component is associated with a pre-response indicating the skill component can generate a response that is personalized to the user 105, that a NLU hypothesis corresponding to the skill component is associated with a NLU confidence score satisfying a condition, e.g., a threshold NLU confidence score, that the skill component was outputting content via the device 110 when the device 110 received the user input, etc. Things that may decrease a skill component's ranking include, for example, that the skill component is associated with a pre-response indicating the skill component cannot generate a response that is personalized to the user 105, that a NLU hypothesis corresponding to the skill component is associated with a NLU confidence score failing to satisfy a condition, e.g., a threshold NLU confidence score, etc.

The skill component ranking component may generate a score for each skill component determined by the skill component proposal component, where the score represents a strength with which the skill component ranking component recommends the associated skill component be executed to respond to the user input. Such a confidence score may be a numeric score (e.g., between 0 and 1) or a binned score (e.g., low, medium, high). The skill selection component 785 may send (step 718), to the orchestrator component 730, a skill component selection hypothesis indicating the top ranked skill component and its corresponding NLU hypothesis.

In response to receiving the skill component selection hypothesis from the skill selection component 785, the orchestrator component 730 may send (step 720), to the skill component 790 corresponding to the skill component identifier included in the skill component selection hypothesis, the NLU hypothesis generated by the NLU component 760 and associated with the skill component identifier. While FIG. 1A illustrates the skill component 790 being implemented by the system 120, in some embodiments the skill component 790 may be implemented separate from but in communication with the system 120 via an external system.

As used herein, a "skill component" may refer to software, that may be placed on a machine or a virtual machine, e.g., software that may be launched in a virtual instance when called, configured to process NLU output data and perform one or more actions in response thereto. For example, for NLU output data including a <PlayMusic> intent, an "artist" entity type, and an artist name as an entity value, a music skill component may output music sung by the indicated artist. For further example, for NLU output data including a <TurnOn> intent, a "device" entity type, and an entity value of "lights," a smart home skill component may cause one or more "smart" lights to operate in an "on" state. In another example, for NLU output data including an <OutputWeather> intent, a "location" entity type, and an entity value corresponding to a geographic location of the device 110, a weather skill component may output weather information for the geographic location. For further example, for NLU output data including a <BookRide> intent, a taxi skill component may book a requested ride. In another example, for NLU output data including a <BuyPizza> intent, a restaurant skill component may place an order for a pizza. In another example, for NLU output data including an <OutputStory> intent and a "title" entity type and corresponding title entity value, a story skill component may output a story corresponding to the title.

A skill component may operate in conjunction between the system 120 and other devices, such as a restaurant electronic ordering system, a taxi electronic booking system, etc. in order to complete certain functions. Inputs to a skill component may come from speech processing interactions or through other interactions or input sources.

A skill component may be associated with a domain, a non-limiting list of which includes a smart home domain, a music domain, a video domain, a weather domain, a communications domain, a flash briefing domain, a shopping domain, and a custom domain.

While FIG. 7 illustrates the skill component 790 being implemented by the system 120, in some embodiments, the skill component 790 may be implemented by a separate system, e.g., a skill system, in communication with the system 120.

The skill component 790 may process to determine output data responsive to the spoken user input, e.g., based on the intent and entity data as represented in the NLU output data received by the skill component 790. For example, if the spoken user input requests the playing of a song, the output data may be an audio file (or link to an audio file) corresponding to the song. For further example, if the spoken user input requests weather information, the output data may be structured or natural language data corresponding to the requested weather information.

The skill component 790 sends (step 722) the output data to the orchestrator component 730. The orchestrator component 730 may send (step 724) the output data to the device targeting component 735. The device targeting component 735 is configured to determine a best device for outputting the response to the user input. In some situations, the best device may not be the device that received the user input.

The device targeting component 735 may use spatial relationship data to determine the best device for outputting the response to the user input. The device targeting component 735 may be in communication with the 7spatial relationship storage 775, which may store spatial relationship data as described herein above with respect to FIG. 1A. In some embodiments, the spatial relationship storage 775 may be implemented as part of a smart home component of the system 120. The smart home component may be configured to maintain a record of spaces, e.g., rooms in a building that each device is associated with. The device targeting component 735 may query (step 726) the spatial relationship storage for spatial relationship data including a device identifier of the second device 110b, that sent the input data to the system 120 at step 702. In response, the device targeting component 735 may receive the spatial relationship data representing the second device 110b and the first device 110a are within some distance of each other, e.g., in a same environment such as a room of a building, described herein above with respect to FIG. 1A.

In the example of FIG. 7, the device targeting component 735 may determine the first device 110a, rather than the second device 110b, is to output the response to the instant user input. For example, the device targeting component 735 may determine the first device 110a is to output the response to the user input in the situation where the output data, generated by the skill component 790, is or includes displayable data, e.g., image data, video data, or multimedia data including image data or video data; the second device 110b does not include and is not associated with a display, and the first device 110a includes or is associated with a display. For further example, the device targeting component 735 may determine the first device 110a is to output the response to the user input in the situation where the output data, generated by the skill component 790, is or includes displayable data, e.g., image data, video data, or multimedia data including image data or video data; the second device 110b includes or is associated with a display, the first device 110a includes or is associated with a display, and the display of or associated with the first device 110a has a better resolution and/or is bigger than the display of or associated with the second device 110b. As another example, the device targeting component 735 may determine the first device 110a is to output the response to the user input in the situation where the output data, generated by the skill component 790, is to be output as audio, the second device 110b does not include and is not associated with a speaker, and the first device 110a includes or is associated with a speaker. For further example, the device targeting component 735 may determine the first device 110a is to output the response to the user input in the situation where the output data, generated by the skill component 790, is to be output as audio, the second device 110b includes or is associated with a speaker, the first device 110a includes or is associated with a speaker, and the speaker of or associated with the first device 110a is of better quality than the speaker of or associated with the second device 110b. As another example, the device targeting component 735 may use spatial relationship data to determine a single device, of various devices in an environment, to "ring" (i.e., output audio indicating an incoming call) in response to receiving a user input requesting a call be initiated. It will be appreciated that the foregoing examples are merely illustrative, and that other situations are possible.

The device targeting component 735 sends (step 728), to the orchestrator component 730, the device identifier of the device to be used to output the response to the user input, i.e., the device identifier of the first device 110a in the example of FIG. 7.

In situations where the output data, generated by the skill component 790, includes data to be output as synthesized speech, the orchestrator component 730 may also send (step 732) the output data to the TTS component 780. The TTS component 780 is configured to generate output audio data including synthesized speech.

In one method of synthesis called unit selection, the TTS component 780 matches input data against a database of recorded speech. The TTS component 780 selects matching units of recorded speech and concatenates the units together to form audio data. In another method of synthesis called parametric synthesis, the TTS component 780 varies parameters such as frequency, volume, and noise to determine audio data including an artificial speech waveform. Parametric synthesis uses a computerized voice generator, sometimes called a vocoder.

The TTS component 780 may send (step 734), to the orchestrator component 730, output audio data including synthesized speech.

The orchestrator component 730 may cause (step 736) the first device 110a to present the response to the user input based on the output data, output from the skill component 790 at step 722, and/or the output audio data output from the TTS component at step 734.

The profile storage 770 may include a variety of data related to individual users, groups of users, devices, etc. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill component enablement data; and/or other data.

The profile storage 770 may include one or more user profiles. Each user profile may be associated with a different user identifier. Each user profile may include various user identifying data (e.g., name, gender, address, language(s), etc.). Each user profile may also include preferences of the user. Each user profile may include or be associated with one or more device identifiers, each representing a respective device registered to the user. Each user profile may include skill component identifiers of skill components that the user has enabled. When a user enables a skill component, the user is providing permission to allow the skill component to execute with respect to the user's inputs. If a user does not enable a skill component, the skill component may be prevented from processing with respect to the user's inputs.

The profile storage 770 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 770 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

Figure 8:
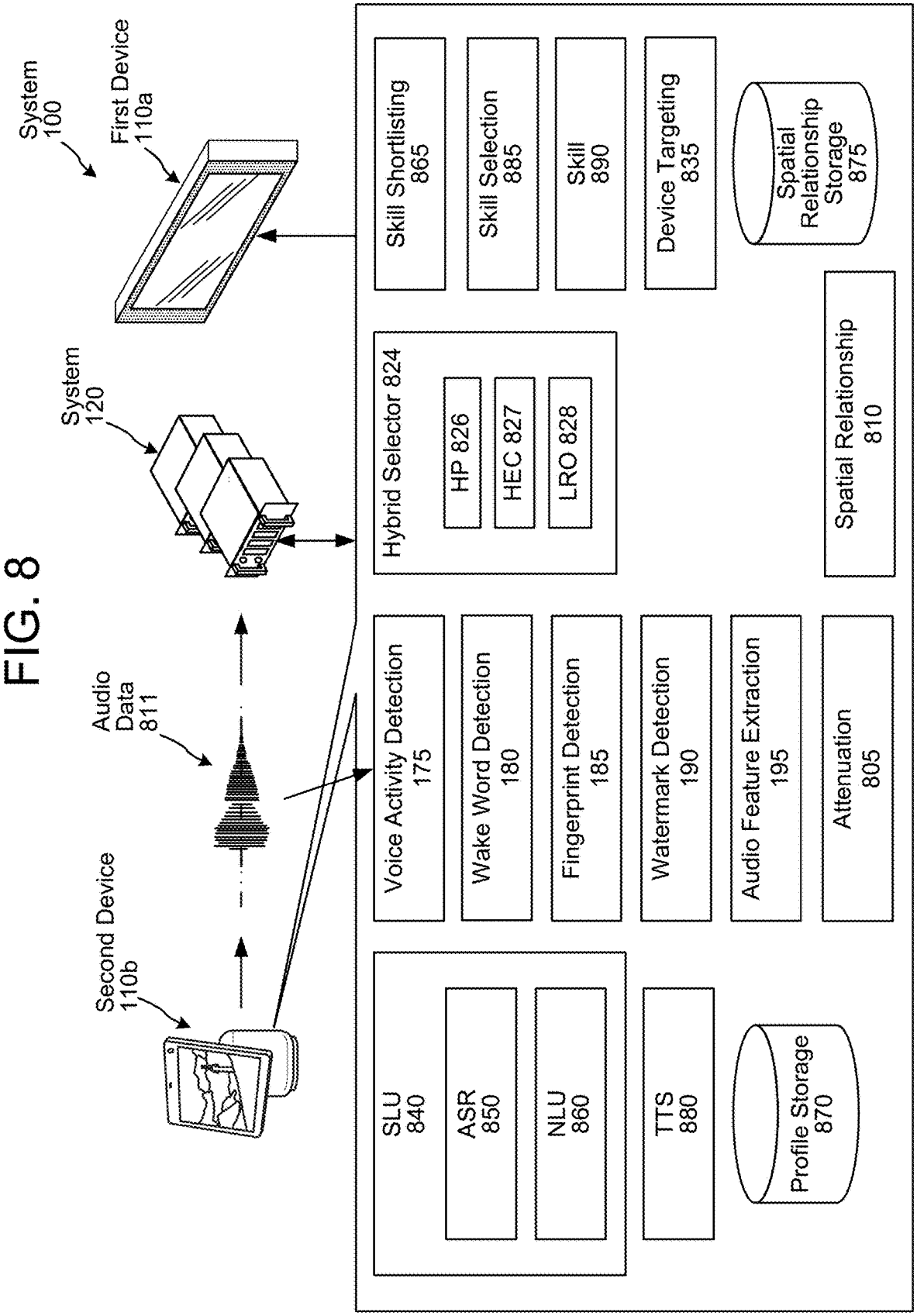
FIG. 8 is a conceptual diagram of components of a device, according to embodiments of the present disclosure.

In some embodiments, the second device 110b may be configured to perform the processing of both the second device 110b and the system 120 described herein above with respect to FIGS. 1A and 7. In other words, the second device 110b may be configured to determine spatial relationship data, process a user input to determine output data, perform device targeting to determine a best device for presenting the output data, and cause the best device to present the output data. FIG. 8 illustrates how the second device 110b may be configured to perform the foregoing processing.

As illustrated in FIG. 8, the second device 110b may include the VAD component 175, the wake word detection component 180, the fingerprint detection component 185, the watermark detection component 190, and the audio feature extraction component 195. The second device 110b may additionally include an attenuation component 805 configured to determination attenuation data based on audio features data output by the audio feature extraction component 195, as described herein above with respect to step 140 of FIG. 1A. The second device 110b also includes a spatial relationship component 810 configured to determine spatial relationship data as described herein above with respect to step 144 of FIG. 1A. The second device 110b may store the spatial relationship data, output by the spatial relationship component 810, in a spatial relationship storage 875. As such, the second device 110b may maintain a record of one or more devices located near the second device 110b, and which can be used to present output data responsive to a user input received by the second device 110b.

In some embodiments, the spatial relationship storage 875 may be implemented as part of a smart home component of the second device 110b. The smart home component may be configured to maintain a record of spaces, e.g., rooms in a building that each device is associated with.

When the second device 110b receives audio and the VAD component 175 processes the audio to determine the audio includes speech, a hybrid selector 824, of the second device 110b, may send the audio data 811 to the wake word detection component 180. If the wake word detection component 180 detects a wake word indicating the audio data 811 includes a spoken user command, the wake word detection component 180 may send an indication of such detection to the hybrid selector 824. In response to receiving the indication, the hybrid selector 824 may send the audio data 811 to the system 120 and/or an ASR component 850 implemented by the second device 110b. The wake word detection component 180 may also send an indication, to the hybrid selector 824, representing a wake word was not detected. In response to receiving such an indication, the hybrid selector 824 may refrain from sending the audio data 811 to the system 120, and may prevent the ASR component 850 from processing the audio data 811. In this situation, the audio data 811 can be discarded.

The second device 110b may conduct its own speech processing using on-device language processing components (such as a SLU component 840, the ASR component 850, and/or a NLU component 860) similar to the manner discussed above with respect to the system-implemented SLU component, ASR component 750, and NLU component 760. The second device 110b may also internally include, or otherwise have access to, other components such as a skill shortlisting component 865 (configured to process in a similar manner to the skill shortlisting component 765), a skill selection component 885 (configured to process in a similar manner to the skill selection component 785), one or more skill components 890 (configured to process in a similar manner to the one or more skill components 790 implemented by and/or in communication with the system 120), a TTS component 880 (configured to process in a similar manner to the TTS component 780 implemented by the system 120), a device targeting component 835 (configured to process in a similar manner to the device targeting component 735 implemented by the system 120), a profile storage 870 (configured to store similar profile data to the profile storage 770 implemented by the system 120), and/or other components. In at least some embodiments, the profile storage 870 may only store profile data for a user or group of users specifically associated with the second device 110b.

In at least some embodiments, the on-device language processing components may not have the same capabilities as the language processing components implemented by the system 120. For example, the on-device language processing components may be configured to handle only a subset of the user inputs that may be handled by the system-implemented language processing components. For example, such subset of user inputs may correspond to local-type user inputs, such as those controlling devices or components associated with a user's home. In such circumstances the on-device language processing components may be able to more quickly interpret and respond to a local-type user input, for example, than processing that involves the system 120. If the second device 110b attempts to process a user input for which the on-device language processing components are not necessarily best suited, the NLU output data, determined by the on-device components, may have a low confidence or other metric indicating that the processing by the on-device language processing components may not be as accurate as the processing done by the system 120.

The hybrid selector 824 may include a hybrid proxy (HP) 826 configured to proxy traffic to/from the system 120. For example, the HP 826 may be configured to send messages to/from a hybrid execution controller (HEC) 827 of the hybrid selector 824. For example, command/directive data received from the system 120 can be sent to the HEC 827 using the HP 826. The HP 826 may also be configured to allow the audio data 811 to pass to the system 120 while also receiving (e.g., intercepting) this audio data 811 and sending the audio data 811 to the HEC 827.

In at least some embodiments, the hybrid selector 824 may further include a local request orchestrator (LRO) 828 configured to notify the ASR component 850 about the availability of the audio data 811, and to otherwise initiate the operations of on-device language processing when the audio data 811 becomes available. In general, the hybrid selector 824 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the second device 110b receives directive data from the system 120 and chooses to use that remotely-determined directive data.

Thus, when the audio data 811 is received, the HP 826 may allow the audio data 811 to pass through to the system 120 and the HP 826 may also input the audio data 811 to the ASR component 850 by routing the audio data 811 through the HEC 827 of the hybrid selector 824, whereby the LRO 828 notifies the ASR component 850 of the audio data 811. At this point, the hybrid selector 824 may wait for response data from either or both the system 120 and/or the on-device language processing components. However, the disclosure is not limited thereto, and in some examples the hybrid selector 824 may send the audio data 811 only to the ASR component 850 without departing from the disclosure. For example, the device 110 may process the audio data 811 on-device without sending the audio data 811 to the system 120.

The ASR component 850 is configured to receive the audio data 811 from the hybrid selector 824, and to recognize speech in the audio data 811, and the NLU component 860 is configured to determine an intent from the recognized speech (an optionally one or more named entities), and to determine how to act on the intent by generating directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

NLU output data (output by the NLU component 860) may be selected as usable to respond to a user input, and local response data may be sent to the hybrid selector 824, such as a "ReadyToExecute" response. The hybrid selector 824 may then determine whether to use directive data from the on-device components to respond to the user input, to use directive data received from the system 120, assuming a remote response is even received (e.g., when the device 110 is able to access the system 120 over the network(s) 199), or to determine output data requesting additional information from the user.

The second device 110b and/or the system 120 may associate a unique identifier with each user input. The second device 110b may include the unique identifier when sending the audio data 811 to the system 120, and the response data from the system 120 may include the unique identifier to identify to which user input the response data corresponds.

In at least some embodiments, the second device 110b may include one or more skill components 890 that may process similarly to the system-implemented skill component(s) 790. The skill component(s) 890 installed on (or in communication with) the second device 110b may include, without limitation, a smart home skill and/or a device control skill configured to control a second device(s), a music skill configured to output music, a navigation skill configured to output directions, a shopping skill configured to conduct an electronic purchase, and/or the like.

The device targeting component 835 may use spatial relationship data, stored in the spatial relationship storage 875 and representing one or more devices located near and in data communication with the second device 110b, to determine the best device for outputting the response to the user input. For example, the device targeting component 835 may determine the first device 110a, rather than the second device 110b, is to output the response to the instant user input. For example, the device targeting component 835 may determine the first device 110a is to output the response to the user input in the situation where the output data, generated by the skill component 890, is or includes displayable data, e.g., image data, video data, or multimedia data including image data or video data, the second device 110b does not include and is not associated with a display, and the first device 110a includes or is associated with a display. For further example, the device targeting component 835 may determine the first device 110a is to output the response to the user input in the situation where the output data, generated by the skill component 890, is or includes displayable data, e.g., image data, video data, or multimedia data including image data or video data; the second device 110b includes or is associated with a display, the first device 110a includes or is associated with a display, and the display of or associated with the first device 110a has a better resolution and/or is bigger than the display of or associated with the second device 110b. As another example, the device targeting component 835 may determine the first device 110a is to output the response to the user input in the situation where the output data, generated by the skill component 890, is to be output as audio, the second device 110b does not include and is not associated with a speaker, and the first device 110a includes or is associated with a speaker. For further example, the device targeting component 835 may determine the first device 110a is to output the response to the user input in the situation where the output data, generated by the skill component 890, is to be output as audio, the second device 110b includes or is associated with a speaker, the first device 110a includes or is associated with a speaker, and the speaker of or associated with the first device 110a is of better quality than the speaker of or associated with the second device 110b. As another example, the device targeting component 835 may use spatial relationship data to determine a single device, of various devices in an environment, to "ring" (i.e., output audio indicating an incoming call) in response to receiving a user input requesting a call be initiated. It will be appreciated that the foregoing examples are merely illustrative, and that other situations are possible.

Figure 9:
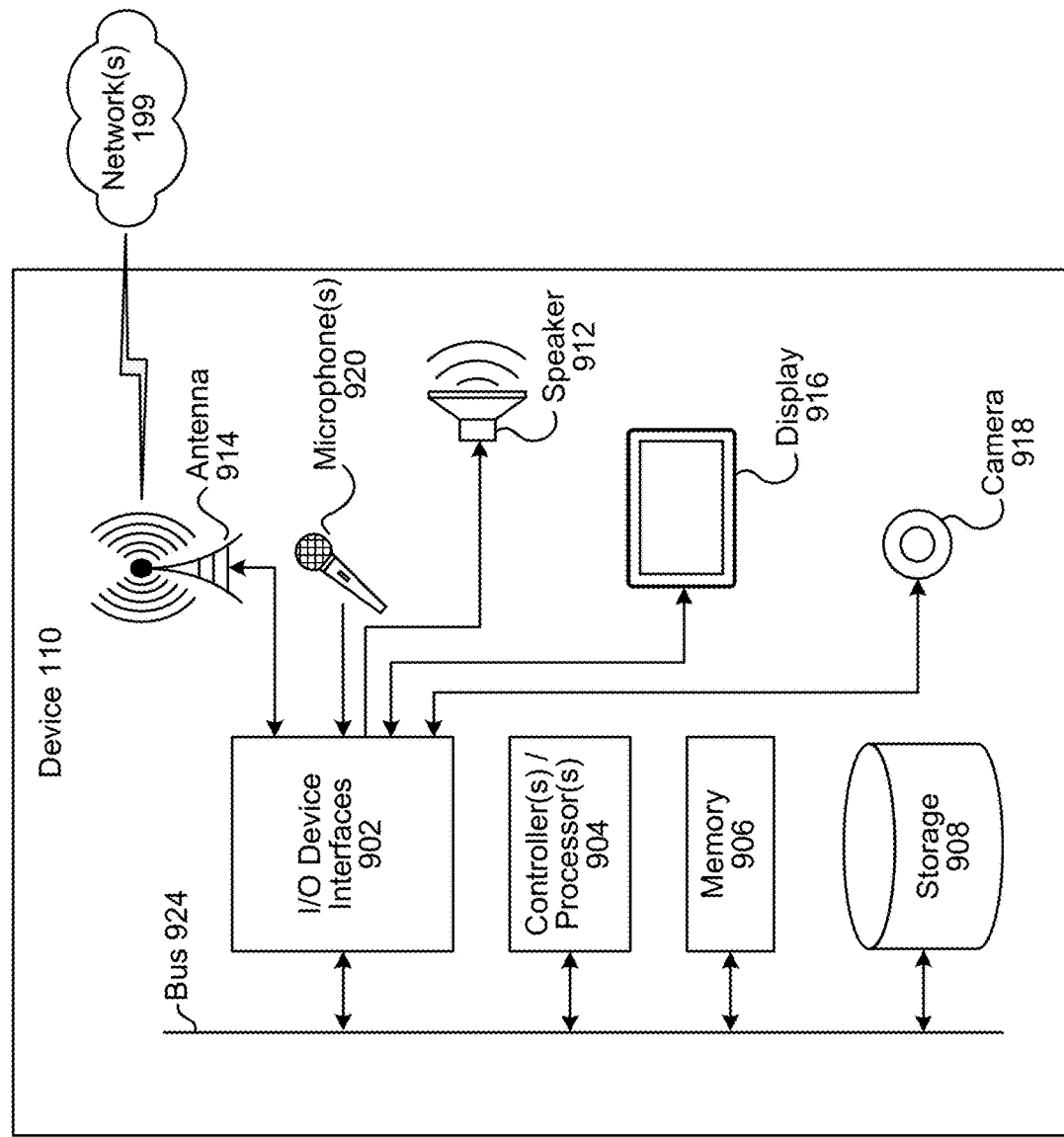
FIG. 9 is a block diagram conceptually illustrating example components of a device, according to embodiments of the present disclosure.
Figure 10:
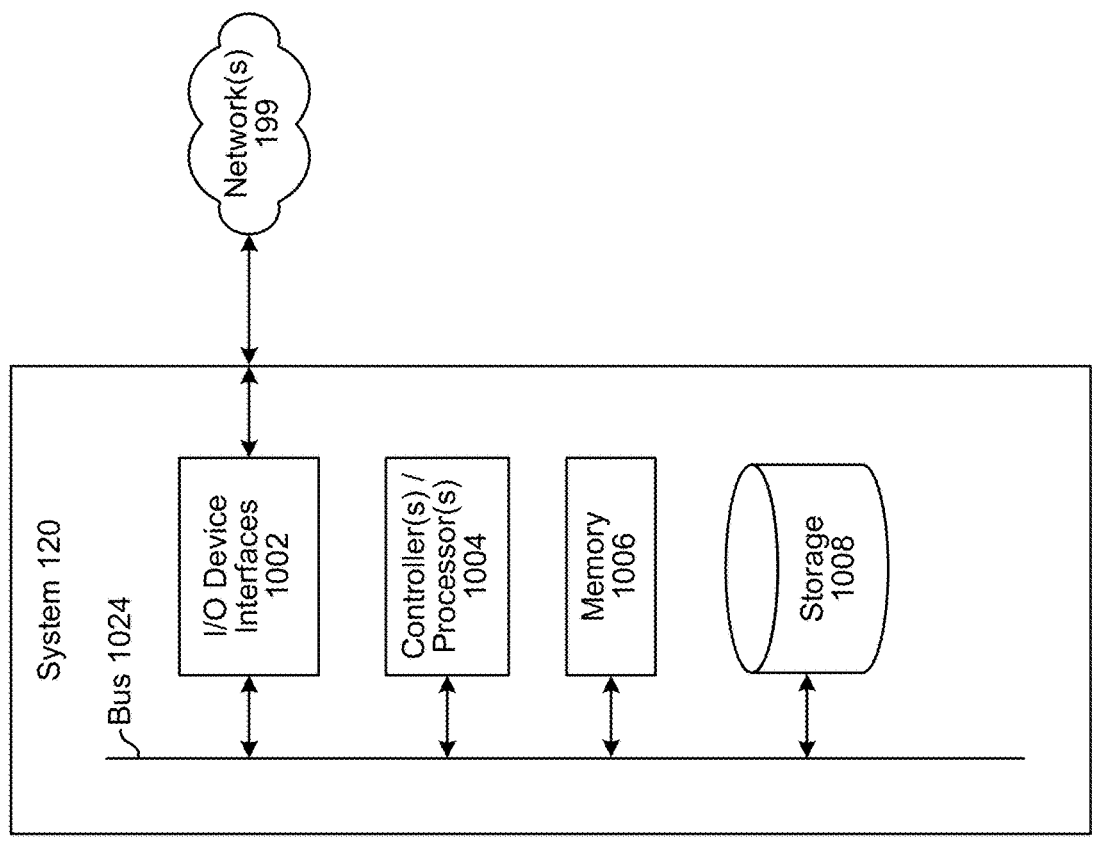
FIG. 10 is a block diagram conceptually illustrating example components of a system, according to embodiments of the present disclosure.

FIG. 9 is a block diagram conceptually illustrating a device 110 that may be used with the system 120. FIG. 10 is a block diagram conceptually illustrating example components of a remote device, such as the system 120, which may assist with ASR processing, NLU processing, etc.; and a skill component. The system 120 may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems 120 may be included in the system 100 of the present disclosure, such as one or more systems 120 for performing ASR processing, one or more systems 120 for performing NLU processing, and one or more skill components, etc. In operation, each of these systems may include computer-readable and computer-executable instructions that reside on the respective system 120, as will be discussed further below.

Each of these devices (110/120) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (902/1002).

Computer instructions for operating each device (110/120) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120) includes input/output device interfaces (902/1002). A variety of components may be connected through the input/output device interfaces (902/1002), as will be discussed further below. Additionally, each device (110/120) may include an address/data bus (924/1024) for conveying data among components of the respective device. Each component within a device (110/120) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device 110, the system 120, and/or a skill component may include their own dedicated processors, memory, and/or storage. Alternatively, one or more of the components of the device 110, the system 120, and/or a skill component may utilize the I/O interfaces (902/1002), processor(s) (904/1004), memory (906/1006), and/or storage (908/1008) of the device(s) 110, system 120, or the skill component, respectively. Thus, the ASR component 750 may have its own I/O interface(s), processor(s), memory, and/or storage; the NLU component 760 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and a skill component, as described herein, are illustrative, and may be located as a stand-alone device or may be included, in whole or in part, as a component of a larger device or system.

Figure 11:
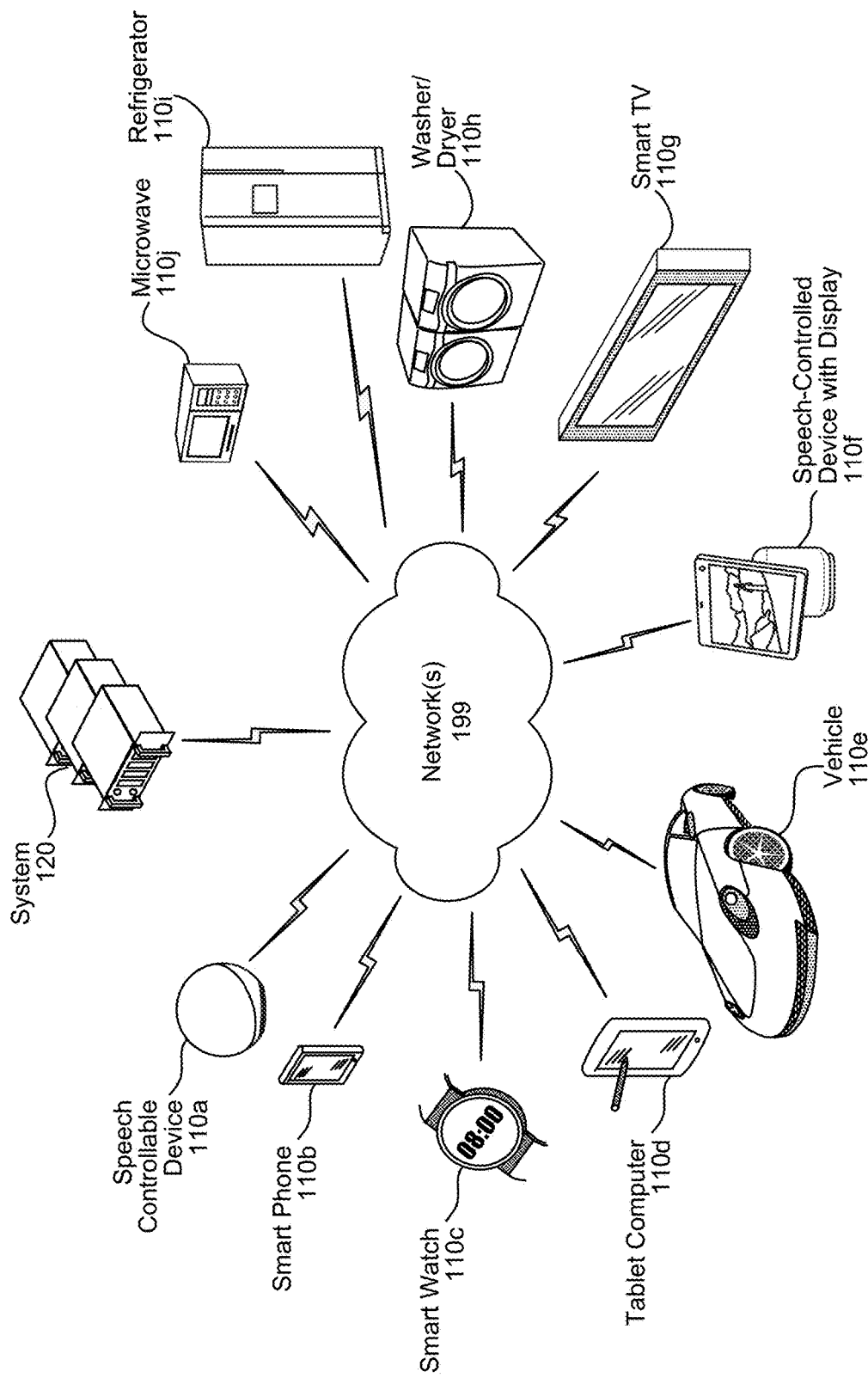
FIG. 11 illustrates an example of a computer network for use with the overall system, according to embodiments of the present disclosure.

As illustrated in FIG. 11, multiple devices (110a-110j, 120) may contain components of the system and the devices may be connected over a network(s) 199. The network(s) 199 may include a local or private network or may include a wide network such as the Internet. Devices may be connected to the network(s) 199 through either wired or wireless connections. For example, a speech controllable device 110a, a smart phone 110b, a smart watch 110c, a tablet computer 110d, a vehicle 110e, a speech-controlled device 110f with a display, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the system 120, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 750, the NLU component 760, etc. of the system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill component in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computing system comprising:
a first device configured to output audio corresponding to an acoustic fingerprint, the audio including a watermark corresponding to an encoded representation of a device identifier of the first device;
at least one processor; and
at least one memory comprising instructions that, when executed by the at least one processor, cause the computing system to:
receive, by a second device, the audio;
determine the audio corresponds to the acoustic fingerprint;
determine, using a decoder and based at least in part on determining the audio corresponds to the acoustic fingerprint, the device identifier encoded in the audio;
generate first data representing a first spectral energy of the audio as received by the second device;
determine, using the first spectral energy, second data representing an attenuation experienced by the audio as the audio traveled from the first device to the second device;
determine a first matrix representing a first spatial position of the first device relative to the second device; and
generate, based on the second data, a second matrix representing a second spatial position of the first device relative to the second device.

2. The computing system of claim 1, wherein the at least one memory further comprises instructions that, when executed by the at least one processor, further cause the computing system to:
determine a device type corresponding to the first device, the device type representing a quality of a speaker configured to output the audio for the first device;
determine volume settings data associated with the device type; and
determine, using the volume settings data, a first volume setting corresponding to a volume at which the audio is to be output,
wherein the first device is configured to output the audio using the first volume setting.

3. The computing system of claim 1, wherein the at least one memory further comprises instructions that, when executed by the at least one processor, further cause the computing system to:
receive, by a third device, the audio;
generate third data representing a second spectral energy of the audio as received by the third device;
determine, using the second spectral energy, fourth data representing an attenuation experienced by the audio as the audio traveled from the first device to the third device; and
generate the second matrix to further represent a third spatial position of the first device relative to the third device.

4. The computing system of claim 1, wherein the at least one memory further comprises instructions that, when executed by the at least one processor, further cause the computing system to:
determine the first device is unable to send data to the computing system; and
determine, based on the first device being unable to send data to the computing system, that the first device is to output the audio;
wherein the first device outputs the audio after the first device is again able to send data to the computing system.

5. A computing system comprising:
at least one processor; and
at least one memory comprising instructions that, when executed by the at least one processor, cause the computing system to:
receive audio from a first device;
determine first data using the audio, wherein the first data represents a first spectral energy of the audio;
determine, using the first data, second data representing an attenuation experienced by the audio as it traveled from the first device; and
generate, based at least in part on the second data, third data representing a spatial position associated with the first device.

6. The computing system of claim 5, wherein the at least one memory further comprises instructions that, when executed by the at least one processor, further cause the computing system to:
determine a device type corresponding to the first device;
determine volume settings data associated with the device type; and
determine, using the volume settings data, a first volume setting corresponding to a volume at which the audio is to be output,
wherein the first device outputs the audio using the first volume setting.

7. The computing system of claim 5, wherein a second device receives the audio, and wherein the at least one memory further comprises instructions that, when executed by the at least one processor, further cause the computing system to:
receive, by a third device, the audio;
determine fourth data representing a second spectral energy of the audio as received by the third device;

determine, using the second spectral energy, fifth data representing an attenuation experienced by the audio as the audio traveled from the first device to the third device; and generate the third data further based at least in part on the fifth data.

8. The computing system of claim 5, wherein the audio is an acoustic fingerprint, and the audio includes a watermark corresponding to an encoded representation of a device identifier of the first device.

9. The computing system of claim 5, wherein the at least one memory further comprises instructions that, when executed by the at least one processor, further cause the computing system to:

receive the audio based at least in part on the first device outputting the audio as part of a device registration process.

10. The computing system of claim 5, wherein the at least one memory further comprises instructions that, when executed by the at least one processor, further cause the computing system to:

receive fourth data representing a spoken natural language input;

determine the spoken natural language input corresponds to an intent to determine a location of a device;

determine the spoken natural language input includes a device name;

determine the first device corresponds to the device name; and cause the first device to output the audio based at least in part on the intent and the first device corresponding to the device name.

11. The computing system of claim 5, wherein the at least one memory further comprises instructions that, when executed by the at least one processor, further cause the computing system to:

determine the first device is unable to send data to the computing system;

after determining the first device is to output the audio, determine that the first device is again able to send data to the computing system; and receive the audio based at least in part on the first device outputting the audio based on the first device again being able to send data to the computing system.

12. The computing system of claim 5, wherein the at least one memory further comprises instructions that, when executed by the at least one processor, further cause the computing system to:

determine a first Wi-Fi signal strength experienced by the first device;

determine a second Wi-Fi signal strength experienced by the first device;

determine the first Wi-Fi signal strength is different from the second Wi-Fi signal strength by at least a threshold amount; and receive the audio based at least in part on the first Wi-Fi signal strength being different from the second Wi-Fi signal strength by at least the threshold amount.

13. A computer-implemented method comprising:
receiving audio from a first device;
determining first data using the audio, wherein the first data represents a first spectral energy of the audio;
determining, using the first data, second data representing an attenuation experienced by the audio as it traveled from the first device; and generating, based at least in part on the second data, third data representing a spatial position associated with the first device.

14. The computer-implemented method of claim 13, further comprising:

determining a device type corresponding to the first device;

determining volume settings data associated with the device type; and determining, using the volume settings data, a first volume setting corresponding to a volume at which the audio is to be output, wherein the first device outputs the audio using the first volume setting.

15. The computer-implemented method of claim 13, wherein a second device receives the audio, and wherein the computer-implemented method further comprises:

receiving, by a third device, the audio;

determining fourth data representing a second spectral energy of the audio as received by the third device;

determining, using the second spectral energy, fifth data representing an attenuation experienced by the audio as the audio traveled from the first device to the third device; and generating the third data further based at least in part on the fifth data.

16. The computer-implemented method of claim 13, wherein the audio is an acoustic fingerprint, and the audio includes a watermark corresponding to an encoded representation of a device identifier of the first device.

17. The computer-implemented method of claim 13, further comprising:

receiving the audio based at least in part on the first device outputting the audio as part of a device registration process.

18. The computer-implemented method of claim 13, further comprising:

receiving fourth data representing a spoken natural language input;

determining the spoken natural language input corresponds to an intent to determine a location of a device;

determining the spoken natural language input includes a device name;

determining the first device corresponds to the device name; and causing the first device to output the audio based at least in part on the intent and the first device corresponding to the device name.

19. The computer-implemented method of claim 13, further comprising:

determining the first device is unable to send data to a computing system;

after determining the first device is to output the audio, determining that the first device is again able to send data to the computing system; and receiving the audio based at least in part on the first device outputting the audio based on the first device again being able to send data to the computing system.

20. The computer-implemented method of claim 13, further comprising:

determining a first Wi-Fi signal strength experienced by the first device;

determining a second Wi-Fi signal strength experienced by the first device;

determining the first Wi-Fi signal strength is different from the second Wi-Fi signal strength by at least a threshold amount; and receiving the audio based at least in part on the first Wi-Fi signal strength being different from the second Wi-Fi signal strength by at least the threshold amount.

\* \* \* \* \*